US009518723B2

(12) United States Patent
Ticktin et al.

(10) Patent No.: US 9,518,723 B2
(45) Date of Patent: Dec. 13, 2016

(54) LIGHTING FIXTURE EXTENSION

(71) Applicant: Brite Shot, Inc., Deerfield Beach, FL (US)

(72) Inventors: Peter Ticktin, Boca Raton, FL (US); Andre Weliky, Boca Raton, FL (US)

(73) Assignee: BRITE SHOT, INC., Deerfield Beach, FL (US)

( * ) Notice: Subject to any disclaimer, the term of this patent is extended or adjusted under 35 U.S.C. 154(b) by 0 days.

(21) Appl. No.: 14/701,127

(22) Filed: Apr. 30, 2015

(65) Prior Publication Data

US 2015/0233558 A1 Aug. 20, 2015

Related U.S. Application Data

(63) Continuation-in-part of application No. 13/820,695, filed as application No. PCT/US2012/032660 on Apr. 7, 2012, now Pat. No. 9,052,417.

(60) Provisional application No. 61/473,576, filed on Apr. 8, 2011, provisional application No. 61/553,011, filed on Oct. 28, 2011.

(51) Int. Cl.
| | |
|---|---|
| *F21V 21/10* | (2006.01) |
| *F21V 21/22* | (2006.01) |
| *F21K 99/00* | (2016.01) |
| *F21V 19/00* | (2006.01) |
| *F21V 21/04* | (2006.01) |
| *F21V 29/60* | (2015.01) |

(52) U.S. Cl.
CPC ............... *F21V 21/22* (2013.01); *F21K 9/13* (2013.01); *F21V 19/0015* (2013.01); *F21V 21/047* (2013.01); *F21V 29/60* (2015.01)

(58) Field of Classification Search
CPC ........................................................ F21V 21/22
USPC ........................................................ 362/429
See application file for complete search history.

(56) References Cited

U.S. PATENT DOCUMENTS

| | | | |
|---|---|---|---|
| 4,046,448 A * | 9/1977 | Miller | ................... F21V 19/006 362/457 |
| 4,054,790 A | 10/1977 | Slaughter | |
| 4,856,452 A * | 8/1989 | Pingel | ..................... B63B 45/04 114/343 |
| 5,738,436 A | 4/1998 | Cummings et al. | |
| 5,741,064 A | 4/1998 | Chin et al. | |
| 5,785,418 A | 7/1998 | Hochstein | |
| 6,082,878 A | 7/2000 | Doubek et al. | |

(Continued)

FOREIGN PATENT DOCUMENTS

| | | |
|---|---|---|
| CA | 2509467 A1 | 11/1996 |
| JP | 2006310057 A | 11/2006 |

(Continued)

*Primary Examiner* — Sean Gramling
(74) *Attorney, Agent, or Firm* — The Concept Law Group, P.A.; Scott D. Smiley; Yongae Jun

(57) ABSTRACT

A lighting assembly is disclosed having a light fixture with a light-source operable to emit light; and a sidewall having a dimension exceeding a maximum opening dimension of a light bulb recess, the light bulb recess defined by a ceiling and having a standard light-bulb outlet disposed therein and the maximum opening dimension limiting the dimension of objects insertable within the light bulb recess. The lighting assembly further includes a telescoping assembly electrically coupling the light-source to the standard light-bulb outlet for supplying power to the light-source.

19 Claims, 22 Drawing Sheets

(56) References Cited

U.S. PATENT DOCUMENTS

| | | |
|---|---|---|
| 7,222,827 B2 | 5/2007 | Crain et al. |
| 7,651,248 B2 | 1/2010 | Hua |
| 8,454,204 B1 | 6/2013 | Chang et al. |
| 8,696,171 B2 | 4/2014 | Vanden Eynden et al. |
| 8,783,938 B2 | 7/2014 | Alexander et al. |
| 8,956,018 B2 | 2/2015 | Deshpande et al. |
| 2006/0090783 A1 | 5/2006 | King-Fai |
| 2008/0198574 A1 | 8/2008 | Woodward et al. |
| 2010/0060130 A1* | 3/2010 | Li ........................ F21V 29/004 313/46 |
| 2011/0075423 A1* | 3/2011 | Van De Ven ........... F21V 17/02 362/249.02 |
| 2013/0051017 A1 | 2/2013 | Heim et al. |
| 2014/0174223 A1 | 6/2014 | Gross et al. |
| 2014/0369039 A1 | 12/2014 | Den Boer et al. |
| 2015/0003073 A1 | 1/2015 | Spiro |
| 2015/0062909 A1 | 3/2015 | Progl et al. |

FOREIGN PATENT DOCUMENTS

| | | |
|---|---|---|
| WO | WO2005043627 A1 | 5/2005 |
| WO | WO2009064433 A1 | 5/2009 |

* cited by examiner

300

300

1400

2500

2500

2700

LIGHTING FIXTURE EXTENSION

CROSS-REFERENCE TO RELATED APPLICATION

This Non-provisional Utility application is a Continuation-in-part application, which claims the benefit of co-pending U.S. Non-provisional patent application Ser. No. 13/820,695, filed on Mar. 4, 2013, which claims priority to PCT Application No. PCT/US2012/32660, filed Apr. 7, 2012, which claims priority to U.S. Provisional Patent Application No. 61/473,576, filed Apr. 8, 2011 and U.S. Provisional Patent Application No. 61/553,011, filed Oct. 28, 2011, the entireties of which are incorporated by reference.

FIELD OF THE INVENTION

The present invention relates generally to lighting assemblies, and more particularly relates to a lighting assembly that is translatable relative to a height of a light-bulb socket and a distance from the socket to a level of the ceiling that is opened below it for achieving the most practical efficacy and visual presentation of the light by permitting replacement lamps to be adjusted to be at the ceiling level.

BACKGROUND OF THE INVENTION

Lighting structures vary widely and accordingly with the applications in which they are utilized. In residential situations, for example, regular low-power lighting is sufficient to light the target area. In other situations, however, such as television studios, high-powered industrial lighting structures are needed. In these studio-type situations, high-powered lighting is utilized to project light onto the subject being filmed or photographed. By providing enhanced lighting, i.e., bright light, the camera is able to focus and clearly depict the subject matter.

Traditionally, brighter lighting means higher-power bulbs, higher energy consumption, and a corresponding increase in heat produced by the light. In fact, in many commercial studio lighting structures, a person cannot safely stand within 3 feet of the light without experiencing a physical discomfort or actual harm from the heat being radiated from the device. Fortunately, at least in film or photography studios, many of these lights are attached to the ceiling, placing them out of reach from most people. However, the increased heat being radiated into the atmosphere must be compensated for by cooling the building or room in which the lighting structure is being used. Therefore, these high-power bulbs are not only are dangerous and expensive to purchase, but end up greatly increasing operating costs in both energy consumption of the lights and in cooling costs for the area. Also, in applications where the lighting structures cannot be placed out of contact from people, such as on-location shoots, the intensely-hot lights provide a constant safety concern.

One application that particularly suffers from the shortcomings of the prior art is the surgical environment. In an operating room, the temperature should remain cool to prevent disease and bacteria from spreading. At the same time, bright lights are needed to light the surgery area. Prior-art bright lights produce heat and are often located in close proximity to the surgeon's head, causing him or her to sweat and/or be uncomfortable. The heat also raises the temperature in the operating room.

Recently, light emitting diode (LED) structures have begun appearing in myriad applications. This is partly because LED lights use dramatically less power than traditional bulbs and, as a result, also produce very little heat. In addition, the lifespan of an LED bulb greatly exceeds that most known prior-art light bulbs. For these reasons, it is becoming clear that LEDs will soon be a viable option for completely replacing most bulbs as lighting elements within the home and elsewhere.

Several entities have experimented with utilizing LEDs in studio lighting structures. Because LEDs do not produce the output of standard light bulbs, in particular, the high-powered studio lights, multiple LEDs, organized in arrays, are utilized to replace each bulb. One example of such a light 100 is shown in FIG. 1, which includes an array 101 of individual LED light sources 102a-n (where a-n represents any number range from 1 to infinity) broadcasting light rays 104a-n in the direction of a subject 106 being lit. Unfortunately, the light rays 104a-n produced by each LED in the array 101 hit the subject 106 at a unique angle, which produces a multitude of shadows with varying intensities on the background 108. More specifically, the light from some of the light sources 102a-n in the array 101 reach the background and are additive, thereby producing a first shadow intensity level 110. This first intensity level 110 is also dependent on the proximity between the radiating light source 102 and the background 108. On other portions of the background 108 a different number of the light sources 102a-n in the array 101 reach the background and produce a second shadow intensity level 112, which is different from the first shadow intensity level 110. FIG. 1 provides only a two-dimensional depiction of this multi-shadow effect. With a three-dimensional subject, the differences in shadow intensities are greatly enhanced. The adjacent multiple shadows are not only unattractive, but are sometimes rather eerie looking. For at least this reason, LED light arrays have not been well received in a studio lighting situation.

Although LEDs generate less heat than typical traditional light bulbs, they, nevertheless, do generate heat. Currently-known LED studio lighting structures require the presence of one or more fans that constantly run and pull air from the environment into the lighting structure and across a set of heat dissipating heat-sink fins. These fans require energy, add weight and cost to the lighting device, provide a point of potential electrical failure (which can serious damage the remaining components that will become too hot), and create noise.

LED lighting devices and systems have come into widespread use in homes and buildings. Known LED structures for regular ambient lighting currently dissipate heat by exposing one or more portions of the LED structure to atmospheric conditions. Some known LED lighting assemblies also expose portions, e.g., the power supply 120 and/or driver/controller circuit 118, if applicable, to the atmosphere as those portions of LEDs also generate heat. In addition, a limited number of LED lighting assemblies have one or more heat sinks 116 attached thereto to facilitate the dissipation of heat through convection. However the form, and although having a generally longer life than traditional bulbs, these known LEDs, when ran for normal periods of time, experience a drastic reduction in bulb intensity.

This is specifically applicable when LED lighting assemblies are obstructed or placed in enclosed spaces where hot air is not easily exchanged with cooler air. One example of this is LED lighting structures placed within a recessed lighting "can." When an LED light is placed within small or enclosed areas, the space surrounding the LED bulbs is not cooled and much of the generated heat from the bulbs remains in that area. This effect is shown in FIG. 2, which illustrates a prior-art LED lighting assembly 200 within a recessed portion 204 of a ceiling 202. The hot air, represented with arrows 206, is not effectively dissipated and continually subjects the assembly 200 to air at high temperatures. As the LED assembly 200 is continually subjected to high temperatures, the lifespan of the assembly 200 is reduced and the probability of heat-related malfunctions is increased. This also renders any heat sinks 208 coupled to those prior-art assemblies 200 to be ineffective and inefficient as they still suffer from the same problems as described above, i.e. the LED assembly 200 is still subjected to previously dissipated heat.

Furthermore, as LED lighting technology is still being developed or has increased manufacturing costs, when compared to those prior-art lighting assemblies, those costs are generally placed on the consumer. As such, LED lighting assemblies can range anywhere from three to ten times more per unit price than for traditional lighting assemblies, such as incandescent light bulbs. Many users dilute those additional initial up-front costs with the continued energy savings associated with LEDs. Therefore, most users desire to maintain the LED lighting assembly lifespan as long as possible to maximize cost efficiency.

In addition, recessed lighting cans within ceilings, particularly in residential settings, include varying dimensions. More particularly, such cans have varying depths between the height of the socket for the bulb and the level of the ceiling. Lighting fixtures currently provided have various distances between the sockets, which accept the bulbs and the ceiling heights. This makes little or no difference if a bulb is inserted. However, if there is a retrofit or new light which is applied and which needs to be flush or partially flush with the ceiling, fixed length shafts between the fixed socket and the lighting appliance are inconvenient. Therefore, for lighting fixtures that are intended to hang relative to the cans at a desired position relative to the ceiling, users must select a lighting fixture with a desired length, which cannot be selectively varied to accommodate differently dimensioned recessed lighting cans.

Therefore, a need exists to overcome the problems with the prior art as discussed above.

SUMMARY OF THE INVENTION

The invention provides an LED array lighting assembly that overcomes the hereinafore-mentioned disadvantages of the heretofore-known devices and methods of this general type and that provides an array of LED light sources that are coupled to a light-emitting lens through a plurality of light guides, where the light-emitting lens blends the light from each of the individual light guides and transmits a blended light product. Furthermore, the novel lighting assembly provides a light-generation source that is disposed in a central or rear section of the overall lighting assembly and guided to a light-emitting lens through one or more light guides. The light assembly further provides one embodiment where the heat generated from the LED light source is effectively and efficiently dissipated. The generated heat is removed by a constant stream of cool air that is driven through the device by a novel heat-dissipating air engine created by a novel structure as described herein.

With the foregoing and other objects in view, there is provided, in accordance with the invention, a lighting assembly that includes a plurality of LED light sources and a light-guide assembly featuring a plurality of light guides, each light guide having a proximal end terminating in a recess and a distal end opposite the proximal end. The light-guide assembly further includes mating cap coupled to the proximal end of the plurality of light guides and that aligns each recess with a corresponding LED light source in the plurality of LED light sources. A light-emitting lens has a receiving surface coupled to the distal end of each of the plurality of light guides and able to transfer light emitted from the distal end of each of the plurality of light guides into the light-emitting lens and a curved light-emitting surface opposite the receiving surface, the light-emitting surface able to emit light from within the light-emitting lens, the light within the light emitting lens being a blend of light emitted from least two of the plurality of light guides.

In accordance with a further feature of the present invention, the light-guide assembly further includes a physical arrangement of the distal ends of the plurality of light guides, where a spacing between each of the distal ends of the plurality of light guides is less than a spacing between each of the proximal ends of the plurality of light guides.

In accordance with another feature, an embodiment of the present invention includes a length separating the proximal end of the of light guides from the distal end of the of light guides and at least one curvature along the length.

In accordance with a further feature of the present invention, a light-source controller is electrically coupled to and operable to energize selective ones of the plurality of LED light sources.

In accordance with a yet one more feature of the present invention, the light-source controller is at least partially disposed between the proximal end of the plurality of light guides and the distal end of the plurality of light guides.

In accordance with an additional feature of the present invention, the plurality of light guides further includes a length separating the proximal end from the distal end and the midsection or length passes through at least a portion of the light-source controller.

In accordance with a yet one more feature of the present invention, the mating cap includes a curved mating surface placing a central axis of at least two of the recesses at angles that differ from each other and a curved mating surface places a central axis of at least two of the recesses at angles that differ from each other.

In accordance with another feature, an embodiment of the present invention also includes a light-guide assembly and a light-source assembly, the light-source assembly including a plurality of LED light sources disposed in a light-emitting arrangement. The light-guide assembly has a light-receiving portion forming a plurality of LED light-receiving recesses, each disposed to correspond to a one of the plurality of LED light sources in the light-emitting arrangement. A light-emitting portion is shaped to broadcast light rays in one or more directions away from the LED light sources. A light-channeling portion including a plurality of light-communication channels, each light-communication channel coupling a one of the plurality of LED light-receiving recesses to the light-emitting portion, wherein the light-emitting portion is further shaped to combine light emitted from at least two of the light-communication channels prior to broadcasting.

In accordance with yet another feature, an embodiment of the present invention includes an overall dimension of the light-emitting arrangement that exceeds an overall dimension of the light-channeling portions coupled at the light-emitting portion.

In accordance with a further feature of the present invention, the plurality of light-communication channels further includes at least one curvature between the LED light-receiving recesses and the light-emitting portion.

In accordance with one more feature of the present invention, a light-source controller is electrically coupled to and operable to energize selective ones of the plurality of LED light sources and the light-source controller is at least partially disposed between the LED light-receiving recesses and the light-emitting portion where the plurality of light-communication channels have a portion that passes through at least a portion of the light-source controller.

In accordance with yet another embodiment of the present invention, a lighting fixture extension adapter is provided with a telescoping assembly having a first end with a male attachment member disposed thereon and a second end, opposite the first end, the second end with a female attachment member disposed thereon. The male attachment member is operably configured to matingly engage a standard light-bulb socket and the female attachment member is operably configured to matingly engage a second male attachment member disposed on a lighting fixture.

In accordance with another feature of the present invention, the telescoping assembly is a non-circle telescoping assembly.

In accordance with another feature of the present invention, the lighting fixture includes a light-source operable to emit light; and a sidewall having a dimension exceeding a maximum opening dimension of a light bulb recess, the light bulb recess defined by a ceiling and having a standard light-bulb socket disposed therein and the maximum opening dimension limiting a dimension of objects insertable within the light bulb recess.

In accordance with a further feature of the present invention, the non-circle telescoping assembly includes a cross section shaped as at least one of a polygon and an oval.

In accordance with yet a further feature of the present invention, the telescoping assembly is operably configured to electrically couple a lighting fixture to the standard light-bulb socket along a selectively adjustable distance. The standard light-bulb socket is selectively couplable to the first end of the telescoping assembly and the lighting fixture is selectively couplable to the second end.

In accordance with another feature of the present invention, the telescoping assembly includes an inner telescoping member and an outer telescoping member, the outer telescoping member dimensioned to receive at least a portion of the inner telescoping member.

In accordance with another feature of the present invention, the male attachment members include male threads that are configured to be inserted into the standard light-bulb socket, the standard light-bulb socket having mating female threads.

In accordance with yet another feature of the present invention, the telescoping assembly includes an inner telescoping member and an outer telescoping member. At least one of the inner and outer telescoping members prevents rotation of the other one of the inner and outer telescoping members.

In accordance with a further feature of the present invention, a telescoping assembly is provided that includes a plurality of telescoping members, the plurality of telescoping members including at least a light-bulb socket engaging telescoping member, an intermediate telescoping member, and an outer telescoping member. The light-bulb socket engaging telescoping member has a first projecting portion configured for insertion within a first L-shaped aperture defined by the intermediate telescoping member and the intermediate telescoping member has a second projecting portion configured for insertion within a second L-shaped aperture defined by the outer telescoping member.

In accordance with another feature of the present invention, the telescoping assembly further includes a spring operably configured to translate at least one of the plurality of telescoping members relative to another one of the plurality of telescoping members in a compression direction and an extension direction, opposite the compression direction.

In accordance with yet another feature of the present invention, the spring is operably configured to bias the outer telescoping member and the intermediate telescoping member in the compression direction toward the light-bulb socket engaging telescoping member.

In accordance with another embodiment, the present invention includes a lighting assembly having a light fixture including a light-source operable to emit light; and a telescoping assembly having a first end with a male attachment member disposed thereon and a second end, opposite the first end. The second end with the light fixture disposed thereon and the male attachment member are operably configured to matingly engage a standard light-bulb socket.

In accordance with another feature of the present invention, the lighting fixture further includes a sidewall having a dimension exceeding a maximum opening dimension of a light bulb recess. The light bulb recess is defined by a ceiling and has a standard light-bulb socket disposed therein and the maximum opening dimension limits a dimension of objects insertable within the light bulb recess.

In accordance with yet another feature of the present invention, the lighting fixture further includes a light-source-supporting substrate within the sidewall and having a front surface and a back surface and defining an aperture between the front surface and the back surface. The lighting fixture also includes a heat-dissipating engine coupled to the back surface of the substrate and in fluid communication with the aperture, the heat-dissipating engine defining an air-flow channel from the aperture, across a portion of the light-source, and out of an exhaust port in the sidewall higher in altitude than the aperture. The heating dissipating engine drives a substantially continuous flow of air from the aperture, across the portion of the light-source, and out of the exhaust port, without the use of a fan. The light-source is supported by the substrate, adjacent the aperture, and operable to emit light from the front surface of the substrate. The light-source is dimensioned to fit within the light bulb recess and is couplable to the standard light-bulb socket.

In accordance with another embodiment of the present invention, at least one of the inner and outer telescoping members have a plurality of apertures spaced apart from one another and aligned along a longitudinal direction of the telescoping assembly. The plurality of apertures are sized to receive a locking member operably configured to secure the outer telescoping member relative to the inner telescoping member in a user-selected position along the longitudinal direction of the telescoping assembly.

In accordance with yet another embodiment, each of the inner and outer telescoping members include a plurality of mating coupling members formed as resilient teeth-like members, the plurality of mating coupling members aligned along a longitudinal direction of the telescoping assembly and operably configured to secure the outer telescoping member relative to the inner telescoping member in a user-selected position along the longitudinal direction of the telescoping assembly.

In accordance with a further feature of the present invention, the telescoping assembly includes a plurality of telescoping members, the plurality of telescoping members including at least a light-bulb socket engaging telescoping member, an intermediate telescoping member, and an outer telescoping member. The light-bulb socket engaging telescoping member has a first projecting portion configured for insertion within a first L-shaped aperture defined by the intermediate telescoping member and the intermediate telescoping member has a second projecting portion configured for insertion within a second L-shaped aperture defined by the outer telescoping member.

In accordance with yet a further feature of the present invention, the lighting assembly further includes an airflow chamber shaped to be in contact with a ceiling and having a sidewall. The sidewall includes an upper end dimension that exceeds the largest dimension of a standard-sized light bulb recess in a ceiling; defines at least one proximal opening; and defines at least one distal opening in fluid communication with the proximal opening, wherein heat created by the light assembly drives a substantially continuous flow of air from the proximal opening, across a portion of the light assembly, and out of the distal opening without the use of a fan. The light assembly is dimensioned and shaped not to completely fit within the standard-sized light bulb recess in the ceiling, the standard-sized light bulb recess being of a size and shape to receive substantially all of a standard-sized light bulb therein.

Although the invention is illustrated and described herein as embodied in an LED array lighting assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the structure being referred to. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. The term "downstream," as used herein indicates a location along a path of flow that is further down the path of flow and occurs after a reference point in that path of flow.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
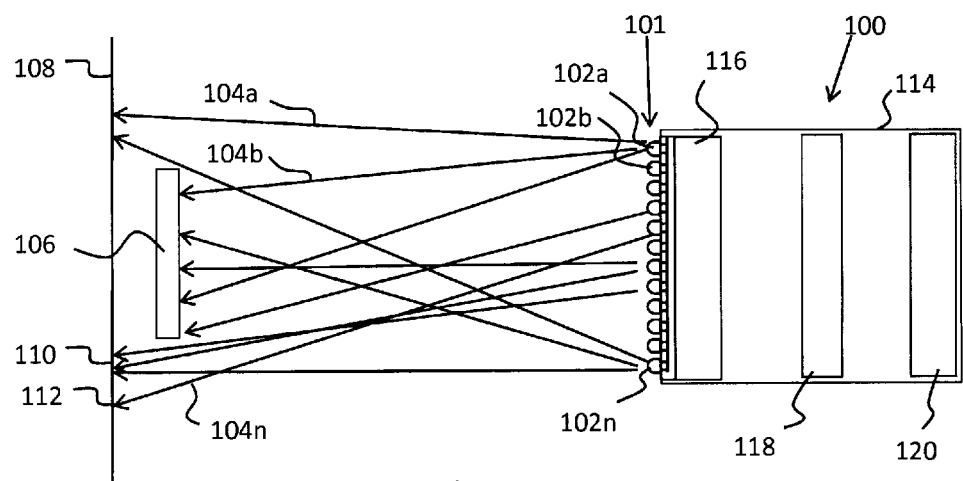
FIG. 1 is a downward-looking elevational view of a prior-art lighting fixture broadcasting light on a subject as well as the background behind the subject.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient lighting assembly for use in studios and other applications. Embodiments of the invention provide an array of LED light sources that are coupled to a light-emitting lens through a plurality of light guides, where the light-emitting lens blends the light from each of the individual light guides and transmits a blended light product. In addition, embodiments of the invention provide a light-generation source that is disposed in a central or rear section of the overall lighting assembly and guided to a light-emitting lens through one or more light guides. Furthermore, embodiments of the invention provide a parabolic reflector that receives and directs light generated by an array of LED light sources within a lighting assembly.

Figure 3:
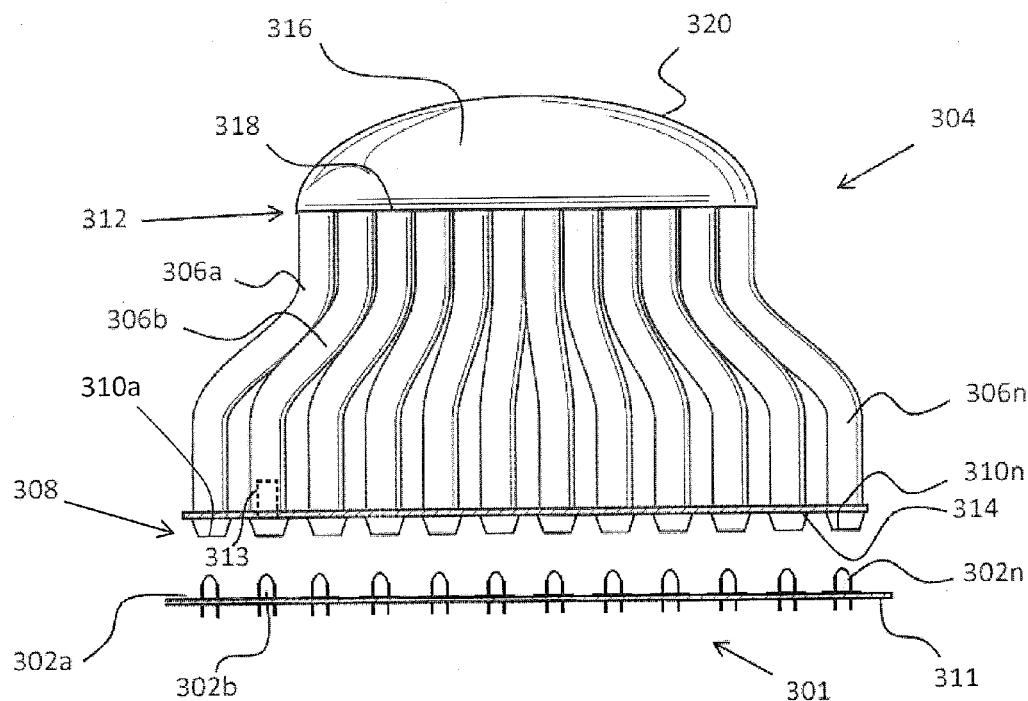
FIG. 3 is a side elevational, partially cross-sectional, view of a lighting-assembly featuring a light-guide assembly aligned with an adjacent light-source assembly in accordance with the present invention.

Referring now to FIG. 3, one embodiment of a lighting assembly in accordance with the present invention is shown in an elevational partial view. FIG. 3 shows several advantageous features of the present invention, but, as will be described below, the invention can be provided in several shapes, sizes, combinations of features and components, and varying numbers and functions of the components. The first example of a lighting assembly 300, as shown in FIG. 3, includes a light-source assembly 301 which includes a plurality of LED light sources 302*a-n*. As used herein, the nomenclature "a-n" is intended to represent a numerical range starting from any number "a" and spanning to any number "n" that is greater than the number "a." LED lights are well known in the art. The specific details of LED construction are deemed not necessary for the instant discussion and will, therefore, not be described herein.

The lighting assembly 300 further includes a light-guide assembly 304 that features a plurality of light-communication channels formed from light guides 306*a-n*. Light guides are known in the art and are also referred to as "optical waveguides," "light pipes," "optical fibers," or other similar terms. The present invention is not restricted to any particular technology or physicality and contemplates utilization of any connecting element that is capable of communicating light waves from one end of the transmitting element to the other. For example, the light guides 306*a-n*, in accordance with one embodiment of the present invention, are optical fibers with a cylindrical dielectric waveguide (nonconducting waveguide) that transmits light along its axis, by the process of total internal reflection. The light guides 306*a-n* may include a core surrounded by a cladding layer, both of which are made of dielectric materials. To confine the optical signal in the core, the refractive index of the core is selected to be much greater than that of the cladding. The boundary between the core and cladding may either be abrupt, in step-index fiber, or gradual, in graded-index fiber and serves to contain the light waves within the core. As shown in FIG. 3, the light guides 306*a-n* fully extend to mate with a portion of the light sources 302*a-n*.

Figure 19:
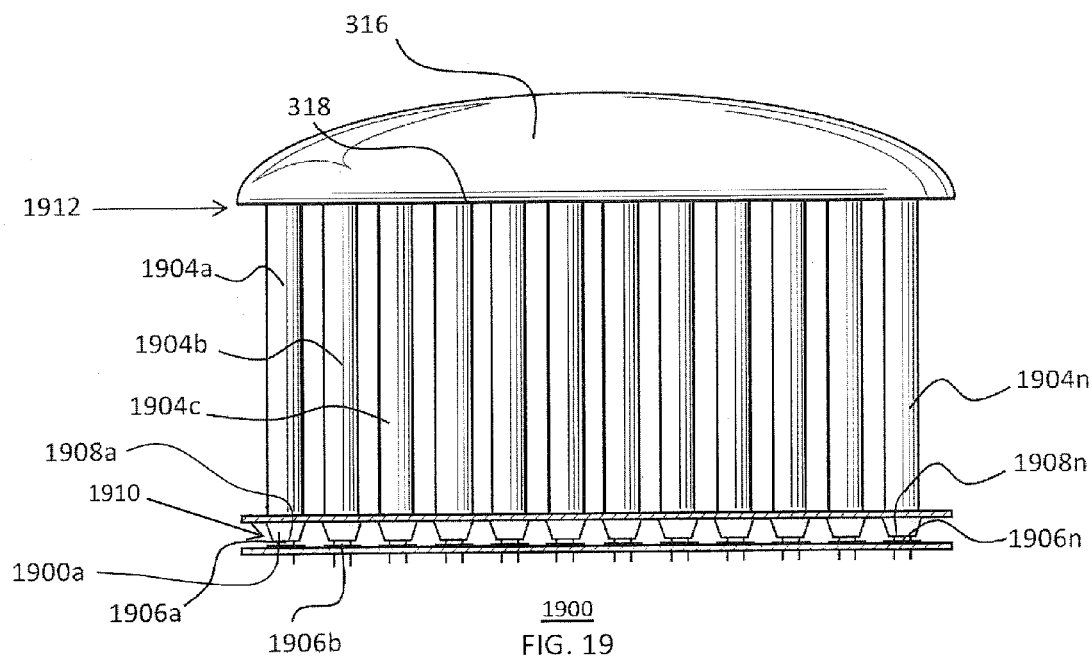
FIG. 19 is a side elevational partial view of a lighting-assembly featuring a light-guide assembly with straight light guides aligned with an adjacent light-source assembly in accordance with the present invention.

Each light guide 306*a-n* will be described with reference to its light-receiving proximal end 308 and its light-emitting distal end 312 opposite the proximal end 308, both of which are illustrated in FIG. 3. The proximal end 308 of each light guide 306*a-n* terminates in an LED light-receiving recess 310*a-n*. More specifically, in one embodiment, each light guide 306*a-n* may have cores of transparent material within each recess 310*a-n*. FIG. 3 also illustrates a cross-section of light guide 306*b* with an aperture 313 formed in a bottom area shaped to receive the end portion of the light source 302*b*. The light guide may have transparent cores that may be formed in the proximal end 308 of the light guides 306*a-n*. In other embodiments, as shown in FIG. 19, the cores 1900*a-n* are removably-couplable to the recesses 310*a-n* with male-female inserts. With the cores 1900*a-n* being removably-couplable, the cores 1900*a-n* may have various-sized apertures 313 to be sized to receive various-sized light sources 302*a-n*. In further embodiments, the light guide 306*a-n* may not have cores such that the recesses 310*a-n* would directly couple with the end of the light sources 302*a-n* and the light guides 306*a-n* may terminate in flat surfaces that physically couple to junctions that couple the recesses 310*a-n* to the light guides 306*a-n*.

In accordance with one embodiment of the present invention, the lighting assembly 300 includes a mating cap 314 that is coupled to the proximal end 308 of the plurality of light guides 306*a-n*. The mating cap 314 secures each of the recesses 310*a-n* in a fixed configuration. Advantageously, the fixed configuration of the recesses 310*a-n* is selected so that one or more recesses 310*a-n* match and align with a corresponding LED light source 302*a-n* in the plurality of LED light sources 302*a-n*. In other words, the mating cap 314 is configured to mate with the array of LED light sources 302*a-n*. This mating is illustrated in FIG. 4, where an upper light-emitting portion of each of the LED light sources 302*a-n* has been placed within a corresponding one of the recesses 310*a-n*, more specifically the apertures 313 formed by the light guides 306*a-n*.

Referring still to FIG. 3, it can be seen that the light assembly 300 further includes a light-emitting lens 316. The light-emitting lens 316 is coupled to the distal end 312 of each of the light guides 306*a-n*. The light-emitting lens 316 includes a receiving surface 318 and a light-emitting surface 320. The coupling between the light-emitting lens 316 and the distal end 312 of the light guides 306*a-n* occurs at the receiving surface 318 of the light-emitting lens 316. The light-emitting lens 316 is formed from a material that facilitates reception of light at the receiving surface 318 and transfers that light to the light-emitting surface 320 with minimal attenuation of the light waves. Similarly, the light guides 306*a-n* and any cores are formed from a material that facilitates transfer of light from one of the plurality of LED light sources 302*a-n* to the light-emitting lens 316 with minimal attenuation of the light waves.

Advantageously, the light received from each one of the plurality of light guides 306*a-n* is combined within the body of the light-emitting lens 316 with the light received from another one of the plurality of light guides 306*a-n*. The combined light waves are then emitted from the light-emitting surface 320 as a combined light wave instead of a plurality of individual light sources as is generally emitted from the prior-art array of LED light sources 302a-n that operate without the assistance of the inventive lighting assembly 300. Because of this blending of the light waves, the present invention advantageously and for the first time makes it possible to replace the high-power, high-heat producing, and high energy consumption prior-art light sources with an array of low-power low-heat producing and low energy consuming LED light sources that do not produce the unwanted multi-shadow effect behind the subject being lit.

Figure 4:
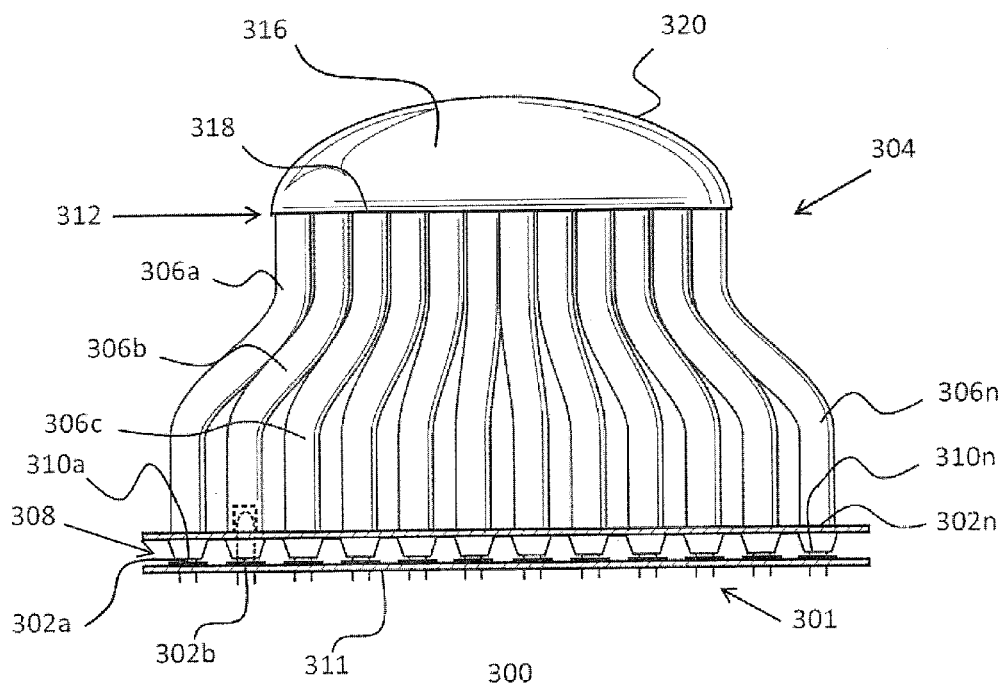
FIG. 4 is a side elevational, partially cross-sectional, view, of the light-guide assembly of FIG. 3 mated with the light-source assembly of FIG. 3.

As the side elevation views of FIGS. 3 and 4 show, there is a difference between the physical spacing of the LED light sources 302a-n and the distance between each of the distal ends 312 of the light guides 306a-n. In other words, an overall dimension of the light-source assembly 301 exceeds an overall dimension of the light-channeling portions 304 coupled at the light-emitting surface 320. Even more specifically, the present invention provides a physical arrangement of the distal ends 312 of the plurality of light guides 306a-n, wherein a spacing between each of the distal ends 312 of the plurality of light guides 306a-n at their connection point to the lens 316 is less than a spacing between each of the proximal ends 308 of the plurality of light guides 306a-n. This difference in spacing can advantageously provide a more focused and intense light at the lens 316 while also providing sufficient spacing between the LED light sources 302a-n to properly dissipate heat generated by each source. Also, as will be explained below, this difference in spacing can provide several further advantages in the overall design of a lighting assembly.

It should be noted that the above-described difference in spacing is not necessary and, as is shown in FIG. 19, each of the light guides 306a-n can be a straight light path, i.e., perpendicular to a support medium 311 on which the LED light sources 302a-n are supported, with a direct physical correspondence on the receiving surface 318 of the lens 316 to the physical spacing of the adjacent light sources 302a-n on the light-source assembly 301.

Figure 5:
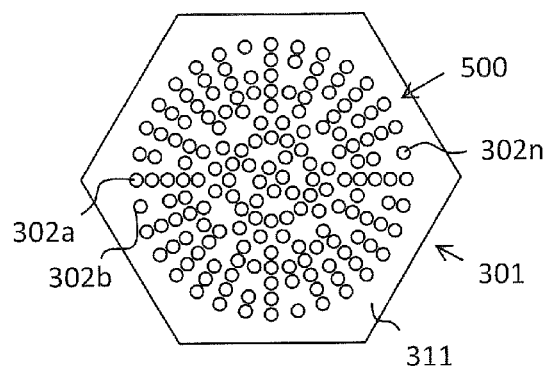
FIG. 5 is a top plan view of the light-source assembly of FIG. 3 illustrating an exemplary arrangement of light sources in accordance with the present invention.

FIG. 5 provides a top plan view of the light-source assembly 301, specifically illustrating the top side of each of the LED light sources 302a-n in an exemplary light-emitting spacing arrangement. The invention, however, is not limited to any particular arrangement of the light sources 302a-n. However, because of the below-described distribution of colored LED lights, the arrangement shown is novel in its ability to produce a broad spectrum of light colors and effects. Advantageously, the LED array pattern 500 is arranged to provide balanced color for the entire output area. The arrangement and specific placement of LED light sources 302, both colored and white, provide a robust lighting device that is capable of simulating myriad conditions and effects.

The LED light sources 302a-n are grouped into strings based on their colors. In the particular embodiment shown, each LED color is spread from the center of the pattern 500 in a spiraling arrangement toward the outer edge of the LED board 311. This arrangement provides a spread that is even, with the outer LEDs overlapping the inner LEDs to produce a consistent color pattern across the face of the light-source assembly 301.

Figure 6:
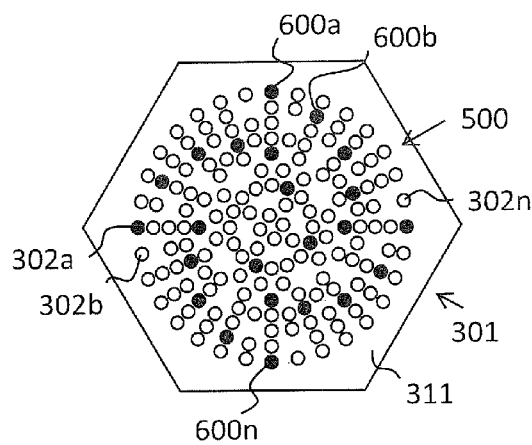
FIG. 6 is a top plan view of the light-source assembly of FIG. 3 illustrating an exemplary arrangement of red light sources in accordance with the present invention.
Figure 7:
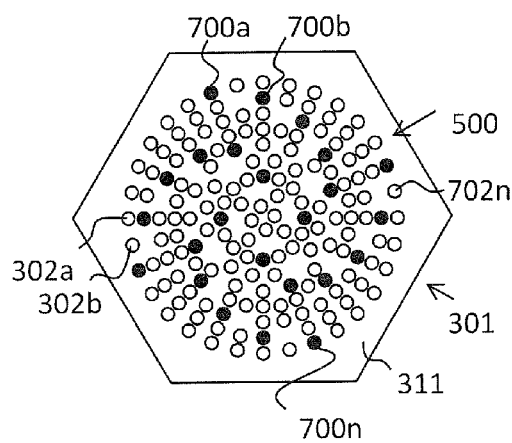
FIG. 7 is a top plan view of the light-source assembly of FIG. 3 illustrating an exemplary arrangement of green light sources in accordance with the present invention.
Figure 8:
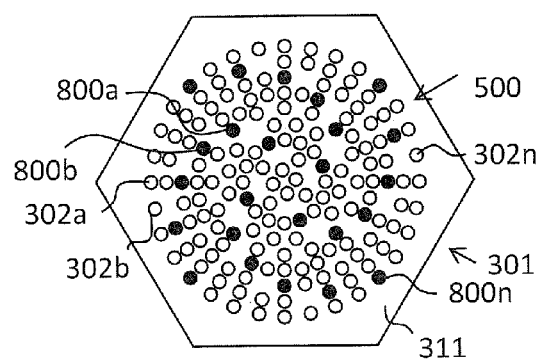
FIG. 8 is a top plan view of the light-source assembly of FIG. 3 illustrating an exemplary arrangement of blue light sources in accordance with the present invention.
Figure 9:
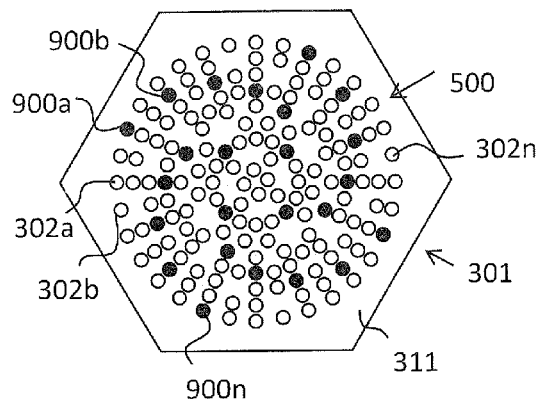
FIG. 9 is a top plan view of the light-source assembly of FIG. 3 illustrating an exemplary arrangement of amber (yellow) light sources in accordance with the present invention.

For the color LEDs light sources 600, 700, 800, 900, shown in FIGS. 6-9, there are, in accordance with an embodiment of the present invention, four strings of six LED light sources spread from the center of the pattern 500. This arrangement forms a spiral pattern with FIG. 6 showing the position of red LED light sources 600a-n, FIG. 7 showing the position of green LED light sources 700a-n, FIG. 8 showing the position of blue LED light sources 800a-n, and FIG. 9 showing the position of Amber (yellow) LED light sources 900a-n. In each figure, that color is represented by a darkened circle. The invention however, is not limited to these particular colors or placement of colors.

Figure 10:
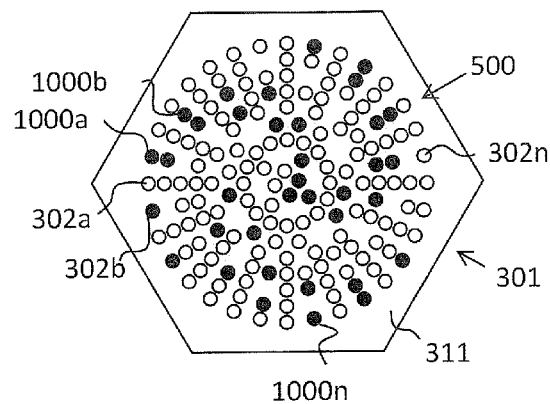
FIG. 10 is a top plan view of the light-source assembly of FIG. 3 illustrating an exemplary arrangement of warm white light sources in accordance with the present invention.
Figure 11:
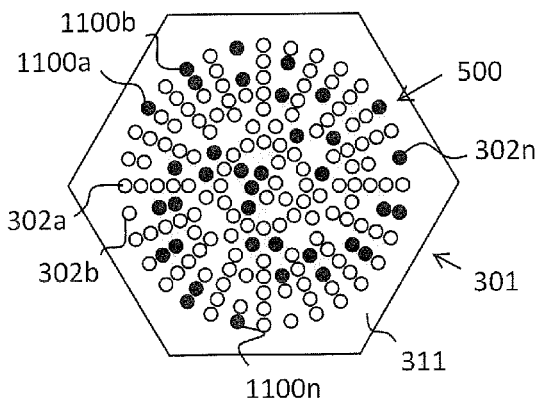
FIG. 11 is a top plan view of the light-source assembly of FIG. 3 illustrating an exemplary arrangement of cool white light sources in accordance with the present invention.

For the White LEDs there are two groups 1000, 1100, shown in FIGS. 10 and 11, of three strings that are spread from the center of the pattern 500. The first group 1000a-n is shown in FIG. 10 and is a warm white group of LEDs that are in the approximately 3000 Kelvin range. The second group 1100a-n is shown in FIG. 11 and is a cool white group that is in the approximately 6500 Kelvin range. By adjusting the intensity of the two groups 1000, 1100, the light-source assembly 301 is able to provide the desired White Temperature that the user desires. Specific examples of which are provided below.

Figure 12:
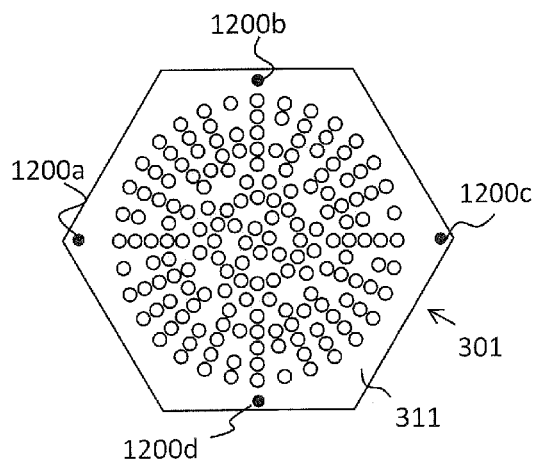
FIG. 12 is a top plan view of a light-source assembly featuring alignment posts in accordance with the present invention.
Figure 13:
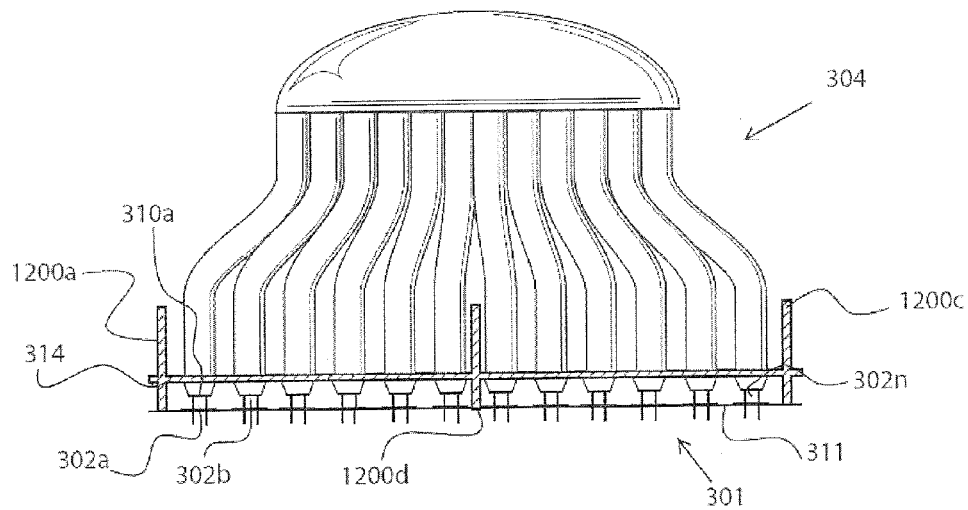
FIG. 13 is a side elevational partial view of a lighting-assembly featuring a light-guide assembly aligned with a light-source assembly through use of the alignment posts of FIG. 12.

Referring now to FIG. 12, a top plan view of the light-source assembly 301 is shown. The embodiment of FIG. 12 includes a set of alignment posts 1200a-d. The alignment posts 1200a-d are attached to the surface of the LED board 311 and extend perpendicularly away (upwards from the drawing page) from the LED support board 311. The alignment posts 1200a-d advantageously ensure that the light-guide assembly 304 is aligned so that each LED light source 302a-n properly mates with each recess 310a-n within the mating cap 314 when the light-guide assembly 304 is attached to the light-source assembly 301. This alignment is illustrated in FIG. 13, where the alignment posts 1200a-d are shown extending from the LED support board 311 and passing through apertures within the mating cap 314. The alignment posts 1200a-d allow each of the recesses 310a-n within the mating cap 314 to drop down and rest directly above each upper surface of each LED light source 302a-n. Although four alignment posts 1200a-d are shown in FIG. 12, the invention is not limited to any specific number of posts. Furthermore, the posts 1200a-d may not be equidistant, or may be equidistant.

In addition to providing alignment between the light-source assembly 301 and the light-guide assembly 304, the alignment posts 1200a-d can have bullet-nosed upper portions for easy insertions and provide an automatic stopping point, which prevents the recesses 310a-n from making physical contact with the LED light sources 302a-n. The presence of a space between the recesses 310a-n and the LED light sources 302a-n and provide improved cooling for the LED light sources 302a-n and possibly improved optical performance. Alternatively, if physical contact between the recesses 310a-n and the LED light sources 302a-n is desired, a stopping point along the alignment posts 1200a-d can prevent excessive contact, i.e., more than just a touching, which could cause damage to either component.

Furthermore, the alignment posts 1200a-d can be provided with threads or other structure that can be used to physically removably couple the light-guide assembly 304 to the light-source assembly 301. More specifically, once the alignment posts 1200a-d are inserted within the apertures formed within the edges of the mating cap 314, and the mating cap 314 is slid down into position where the LED light sources 302a-n mate with the recesses 310a-n, nuts, clamps, or other devices are coupled to the alignment posts 1200a-d and prevent the mating cap 314 from being removed from the alignment posts 1200a-d.

Figure 14:
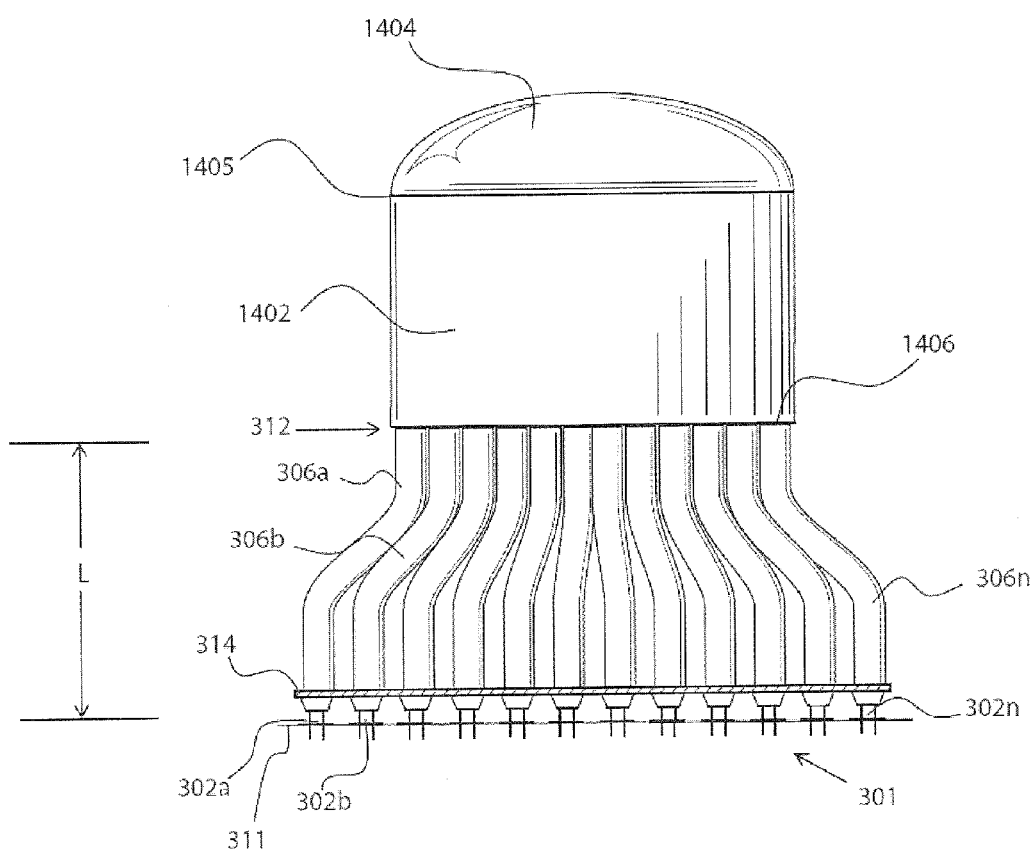
FIG. 14 is a side elevational partial view of a lighting-assembly featuring a light-guide assembly that includes a lens body disposed between the lens and the light guides in accordance with an exemplary embodiment of the present invention.

Referring now to FIG. 14, a further embodiment of a light-guide assembly 1400 is illustrated. The light-guide assembly 1600 shares many similarities with the light-guide assembly 304 shown in FIG. 3, but includes an intermediate body portion 1402 disposed between its lens 1404 and the light-source assembly 301. The intermediate body portion 1402 features lens-mating surface 1405 and a light-guide mating surface 1406, which mates with the distal ends 312 of the light guides 306a-n. It should be noted that the intermediate body portion 1402 and the lens 1404 can be a single integral component and an actual junction or surface 1405 is not necessary between the two elements. The intermediate body portion 1402 is selected of a material that is capable of receiving light rays from the distal ends 312 of the light guides 306a-n and communicating the light to the lens 1404. Preferably, the communication of light through the intermediate body portion 1402 results in minimal attenuation of the light rays.

Advantageously, the intermediate body portion 1402 provides enhanced directivity of the multiple sources of light, i.e., multiple outputs from the light guides 306a-n. More specifically, as light is emitted from each of the LED light sources 302a-n, the light rays exit each of the LED light sources 302a-n at multiple angles. With reference to the surface of the LED board 311, light is emitted from each of the LED light sources 302a-n at angles from perpendicular to parallel with the surface of the LED board 311. Most, if not all, of the light emitted from the LED light sources 302a-n is contained within each of the corresponding light guides 306a-n and, due to the internally-reflective properties of the light guides 306a-n, is guided into the intermediate body portion 1402. As the light exits each respective light guide 306a-n, some components of the light rays will have angular values greater than one, i.e., will not be parallel with a longitudinal axis of the light guide 306a-n at its point of connection to the surface 1406 of the intermediate body portion 1402. The intermediate body portion 1402 provides additional internally-reflective structure that guides and aligns the individual light rays in a direction toward the lens 1404. Stated differently, the intermediate body portion 1402 becomes somewhat of a master light guide that receives and channels light from the plurality of light guides 306a-n to the lens 1404.

In addition, because the multiple light rays are being guided by and reflected within the intermediate body portion 1402, the light rays exiting each of the individual light guides 306a-n are further blended as they pass through the intermediate body portion 1402 allowing the lens 1404 to output a smooth blend of the multiple light sources 302a-n.

In each of the embodiments so far shown in the figures, there is a distance L between the mating cap 314 and the connection point of the distal ends 312 of the light guides 306a-n. In addition, in each of the embodiments so far shown in the figures, there is less space between each of the adjacent distal ends 312 of the light guides 306a-n than between each of the LED light sources 302a-n. This difference in spacing causes at least some of the light guides 306a-n to have a curvature along their length. As is known in the field of optics, as the amount of curvature in the transmission path increases, so too does the attenuation of the light rays trying to pass through the length of the light guide 306. Conversely, the straighter the light path through the light guide, the less the attenuation, diffraction, and degradation of directivity experienced by the light rays. Therefore, it is advantageous to reduce the amount of curvature along the length of each light guide 306a-n. This can be accomplished by increasing the value of the length L between the mating cap 314 and the connection point of the distal ends 312 of the light guides 306a-n.

Referring briefly once again to FIG. 1, the prior-art lighting assembly 100 is shown in an elevational cutaway view, and illustrates three components located within the interior of the housing 114 of the lighting assembly 100. Attached to a backside of the light-source assembly 100 is a heat sink assembly 116. A "heat sink" is a term of art for a component or assembly that transfers heat generated within a solid material to a fluid medium, such as air or a liquid. A heat sink is physically designed to increase the surface area in contact with the cooling fluid surrounding it, such as the air, allowing the heat transfer through convection. Heat sink assemblies are known in the art and the heat sink assembly 116 can include a variety of components that facilitate the removal of heat from the light-source assembly 100. Exemplary components include cooling fans, cooling fluids, cooling fins, and others. The function of the heat sink assembly 116 is to remove or reduce heat generated by the light-source assembly 100 during operation. As is known in the art, LED light sources 102a-n produce drastically less heat than conventional light bulbs, such as incandescent light bulbs. However, heat is generated and is preferably reduced or removed from within the interior of the lighting assembly 100.

In addition, the prior-art lighting assembly 100 includes a driver/controller circuit 118 that is at least partially disposed within the housing 114. The driver/controller circuit 118 controls which ones of the plurality of LED light sources 102a-n are activated at any given time and can also control intensities of particular ones of the plurality of LED light sources 102a-n and colors thereof. Finally, near the rear or, in many cases, fully or partially on the exterior of the rear of the prior-art lighting assembly 100, is a power supply 120. The power supply 120 provides the appropriate voltages to the light-source assembly 100 as controlled by the driving circuit 120.

The components of prior-art lighting assemblies, such as the one illustrated in FIG. 1, are restricted to the layout shown. That is, the light-source assembly 100 must be at one extreme end of the housing 114 so that no other components block its light output. Because the heat sink assembly 116 must be coupled to or in close proximity to the light-source assembly 100, the heat sink assembly 116 as always found within the housing 114. The power supply 120 and driving circuit 118 are not necessarily restricted to their order with reference to the light-source assembly 100 but, because the power supply 120 generates heat, it is virtually always located on a side of the housing 114 opposite the light-source assembly 100.

Advantageously, the present invention is not restricted to the component architecture shown in FIG. 1 and found in the prior-art devices. Thus, the present invention enjoys several benefits that result from exchanging the order of components shown in FIG. 1. More specifically, with reference now to FIG. 15, one exemplary embodiment of the present invention is shown in an elevational side partially cross-sectional view. This view shows that the light-source assembly 301 is no longer at the distal end 1502 of the light-assembly housing 1504, but, instead, resides near the proximal end 1516 of the light-assembly housing 1504. At the distal end 1502 is a lens 1506. The lens 1506 is coupled to a lens body 1508, however, the lens body 1508 is not necessary and the lens 1506 may be coupled directly to the distal end 1510 of the light guides 1512a-n.

At a location along a length of the light-guides 1512a-n, i.e., between the distal ends 1510 and the proximal ends 1514, is a driver/controller circuit 1515. As will be explained in greater detail below, the driver/controller circuit 1515 includes the processing ability to individually address (energize—at various levels) certain ones, if not all, of the light sources 302a-n within the light-source assembly 301.

As with the light-guide assembly 304 shown in FIG. 3, the proximal end 1514 of each light guide 1512a-n terminates in a recess 1522a-n. More specifically, each light guide 1512a-n may have one or more cores 1900a-n (shown in FIG. 19) of transparent material at least partially within each recess 1522a-n, in accordance with an embodiment of the present invention. As described above, the core 1900a-n has a concave upper area formed in the core of the proximal end 1514 of the light guides 1512a-n. In other embodiments, the light guides 1512a-n can terminate in flat surfaces that physically coupled to junctions that couple the recesses 1522a-n to the light guides 1512a-n or may terminate in other surfaces shaped to couple to one or more light sources 302a-n.

Continuing toward the proximal end 1516 of the lighting assembly 1600, a mating cap 1518 is found on a side of the driver/controller circuit 1515 opposite from the lens 1506. The mating cap 1518 is coupled to the proximal end 1514 of the plurality of light guides 1512a-n. The mating cap 1518 secures each of the recesses 1522a-n in a fixed configuration. Advantageously, the fixed configuration of the recesses 1522a-n is selected so that one or more recesses 1522a-n match and align with a corresponding LED light source 302a-n in the plurality of LED light source array 301. In other words, the mating cap 1518 is configured to mate with the array of LED light sources 301.

In one embodiment, the driver/controller circuit 1515 is formed on a circuit board with an aperture formed within its center so that the light guides 1512a-n can pass through this aperture to reach the lens body 1508 or lens 1506 (in embodiments where the lens body 1508 is not present). Alternatively, the light guides 1512a-n can pass next to the driver/controller circuit 1515. Regardless of the exact physical relationship between the light guides 1512a-n and the driver/controller circuit 1515, never before has the driver/controller circuit 1515 been able to be provided on the light broadcasting side of the LED light sources 302a-n, i.e., between the LED light sources 302a-n and the lens 1506. The repositioning of the LED light sources 302a-n to the proximal end 1516 of the lighting assembly 1600 advantageously straightens the light guides 1512a-n, thereby eliminating or reducing any curvature along the light path through the light guides 1512a-n. The reduction in curvature of the light guides 1512a-n eliminates or reduces attenuation and reflection losses of the light waves being communicated.

In addition, the majority of the heat producing components, i.e., the power supply 1524 and the heat sink 1526, are on the proximal or rear portion of the lighting assembly 1600. Advantageously, the main focus of any heat reduction measures can now be directed to the rear section of the lighting assembly 1600, where they can efficiently remove heat from that portion of the lighting assembly 1600. Furthermore, the driver/controller circuit 1515, which may feature several components that are sensitive to heat, is removed or distanced from the area where the greatest amount of heat is produced. That is, with prior-art devices, the driver/controller circuit 1515 was always positioned between the heat-producing light source assembly 301 and the heat-producing power source 1524. Through embodiments of the present invention, the driver/controller circuit 1515 can now, for the first time, be positioned toward the distal (front) portion 1502 of the lighting assembly 1600 where less heat is present.

Figure 16:
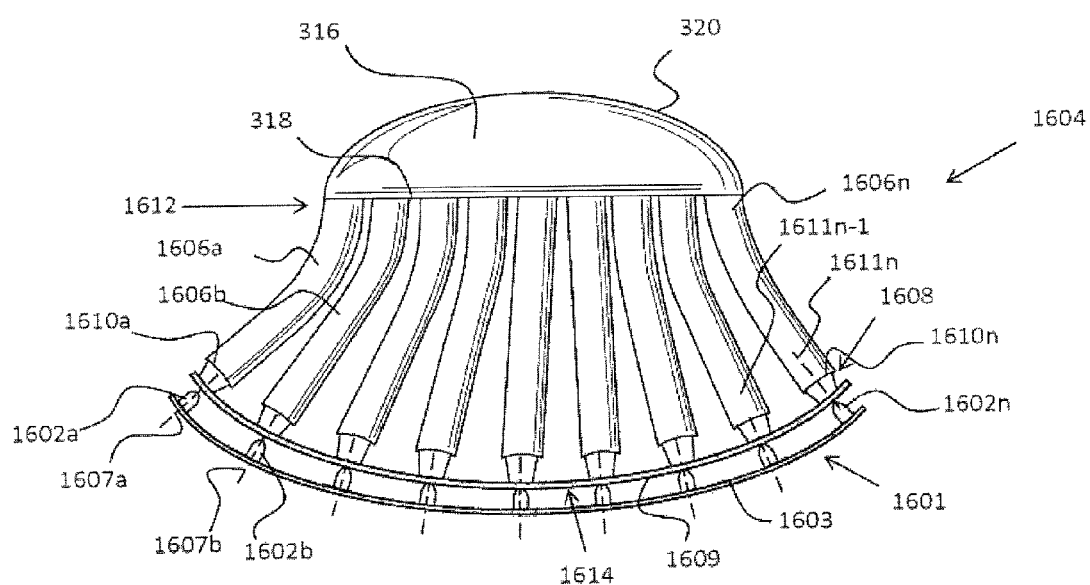
FIG. 16 is a side elevational partial view of a lighting-assembly featuring a light-guide assembly aligned with an adjacent light-source assembly, where the support surface of the light-source assembly features a curvature and the mating cap of the light-guide assembly features a corresponding curvature in accordance with the present invention.

Referring now to FIG. 16, another exemplary embodiment of the present invention is shown in a side elevational view. FIG. 16 shows several advantageous features of the present invention, but the invention can be provided in various shapes, sizes, combinations of features and components, and varying numbers and functions of the components. The lighting assembly 1600, as shown in FIG. 16, includes a light-source assembly 1601 which includes a plurality of LED light sources 1602a-n supported on a curved support surface 1603, e.g., a circuit board. The curved support surface 1603 places a central axis 1607a-n of at least two of the light sources 1602a-n at angles that differ from each other.

They lighting assembly 1600 further includes a light-guide assembly 1604 that features a plurality of light guides 1606a-n, each having a proximal end 1608 and its distal end 1612 opposite the proximal end 1608. The proximal end 1608 of each light guide 1606a-n terminates in a recess 1610a-n. More specifically, each light guide 1606a-n has an aperture at least partially within each recess 1610a-n, in accordance with an embodiment of the present invention. In other embodiments, the light guides 1606a-n can terminate in flat surfaces that physically coupled to junctions that couple the recesses 1610a-n to the light guides 1606a-n.

In accordance with one embodiment of the present invention, the lighting assembly 1600 includes a mating cap 1614 that is coupled to the proximal end 1608 of the plurality of light guides 1606a-n. The mating cap 1614 secures each of the recesses 1610a-n in a fixed configuration and is also shaped in a curvature that is complimentary to the curvature of the curved support surface 1603. More specifically, the curved mating surface 1609 of the mating cap 1614 places a central axis 1611a-n of at least two of the recesses 1610a-n at angles that differ from each other. Advantageously, the curvature of the mating cap 1614 places each of the recesses 1610a-n in a position to match and align with a corresponding LED light source 1602a-n in the plurality of LED light sources. In an alternative embodiment, the recesses 1610a-n are integral with the mating cap 1614. That is, the recesses 1610a-n and the mating cap 1614 are formed as a single component.

FIG. 16 also shows that the light assembly 1600 further includes a light-emitting lens 316 that is coupled to the distal end 1612 of each of the light guides 1606a-n. The light-emitting lens 316 includes a receiving surface 318 and a light-emitting surface 320. The coupling between the light-emitting lens 316 and the distal end 1612 of the light guides 1606a-n occurs at the receiving surface 118 of the light-emitting lens 316. The light-emitting lens 316 is formed from a material that facilitates reception of light at the receiving surface 318 and transfer of that light to the light-emitting surface 320 with minimal attenuation of the light waves. Similarly, the light guides 1606a-n and any cores 1900a-n are formed from a material that facilitates transfer of light from one of the plurality of LED light sources 1602a-n to the light-emitting lens 316 with minimal degradation of the light waves.

Advantageously, the curvature of the curved support surface 1603 places each of the LED light source 1602a-n at an angle that faces the receiving surface 318 of the lens 316. This variation in angle from the embodiment shown in FIGS. 3 and 4 reduces the needed bend of the light guides 1606a-n, which therefore reduces the transmission loss of the light waves being communicated within and through the light guides 1606a-n.

Advantageously, once inside the lens 316, the light received from each one of the plurality of light guides 1606a-n is combined with the light received from another one of the plurality of light guides 1606a-n. The combined light waves are then emitted from the light-emitting surface 320 as a combined light wave. Because of this blending of the light waves, the present invention advantageously and for the first time makes it possible to replace the high-power, high-heat producing, and high energy consumption prior-art light sources with an array of low-power low-heat producing and low energy consuming LED light sources that do not produce the unwanted multi-shadow effect behind the subject being lit.

As the side elevation views of FIG. 16 show, there is a difference between the physical spacing of the LED light sources 1602a-n and the distance between the distal ends 1612 of the light guides 1606a-n. That is, the present invention provides a physical arrangement of the distal ends 1612 of the plurality of light guides 1606a-n, wherein a spacing between each of the distal ends 1612 of the plurality of light guides 1606a-n at their connection point to the lens 316 is less than a spacing between each of the proximal ends 1608 of the plurality of light guides 1606a-n. This difference in spacing can advantageously provide a more focused and intense light at the lens 316.

In one embodiment, the light guide assembly 1604 shown in FIG. 16 is not present. Because of the curvature of the supporting surface 1603, light from the light sources 1602a-n is focused directly on the receiving surface 318 of the lens 316. The light directed to the receiving surface 318 is received through the receiving surface 318 and efficiently emitted from the emitting surface 320.

Figure 17:
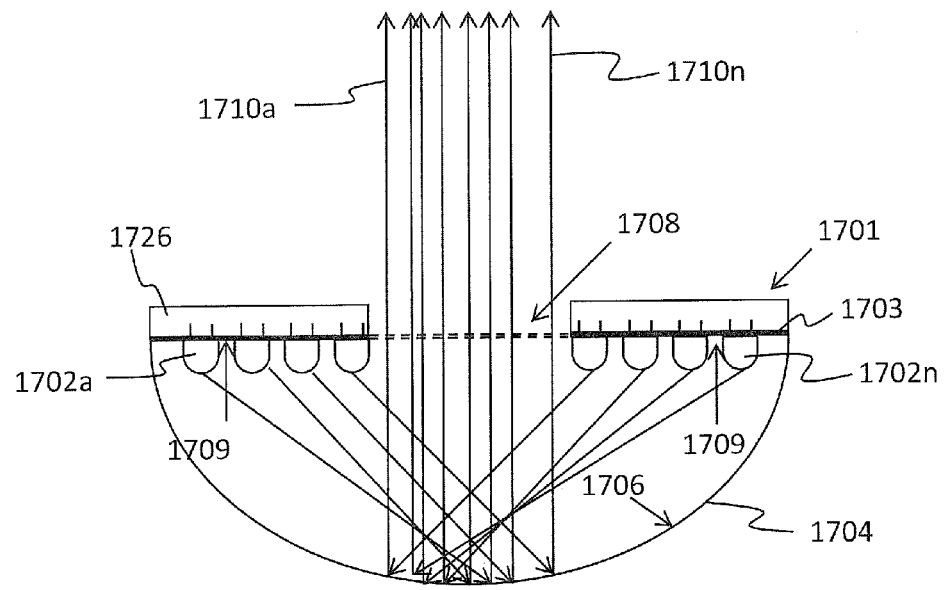
FIG. 17 is a side elevational, cross-sectional, partial view of a lighting-assembly featuring an inverted light-source assembly with a light-transmitting aperture positioned above a parabolic mirror in accordance with the present invention.

Referring now to FIG. 17, a further embodiment of the present invention is illustrated in a side elevational cross-sectional view. The exemplary light assembly 1700 of FIG. 17 includes a light-source assembly 1701, which includes a plurality of LED light sources 1702a-n coupled to a support surface 1703. The support surface 1703 can be, for example a circuit board selectively delivering power to the LED light sources 1702a-n. In this embodiment, unlike those shown and described above, the plurality of LED light sources 1702a-n are coupled to a side of the support surface 1703 that is opposite to the light-transmission direction, illustrated by light rays 1710a-n. Coupled to an upper side of the support surface 1703 is a heat sink 1726. The heat sink 1726 functions to remove heat from the light-source assembly 1701.

Disposed below the support surface 1703, i.e., on the same side of the support surface 1703 as the LED light sources 1702a-n, is a parabolic reflector 1704. The parabolic reflector 1704 is provided with a reflective interior surface 1706 that reflects light produced by the LED light sources 1702a-n when they are energized. Parabolic reflectors are well known in the art; therefore, the details of which will not be described here. In addition, the support surface 1703 can be provided with a reflective surface 1709 that further reflects light back to the parabolic reflector 1704.

As can also be seen in FIG. 17, the support surface 1703 has an aperture 1708 that allows light rays 1710a-n reflected by the parabolic reflector 1704 to pass through the support surface 1703. Of course, the light rays 1710a-n shown in FIG. 17 illustrate only a small sample of the light rays that would actually be generated by the LED light sources 1702a-n and reflected within and by the parabolic reflectors 1704. Advantageously, the individual light rays generated by each of the individual LED light sources 1702a-n, would be combined and focused by the effect of the parabolic reflectors 1704, thereby producing a composite light ray that is not predisposed to producing a multi-shadow behind the subject being eliminated by the inventive light assembly 1700. Although not shown in FIG. 17, the light rays 1710a-n can be directed to a lens that further directs the light rays 1710a-n to the intended subject.

Figure 18:
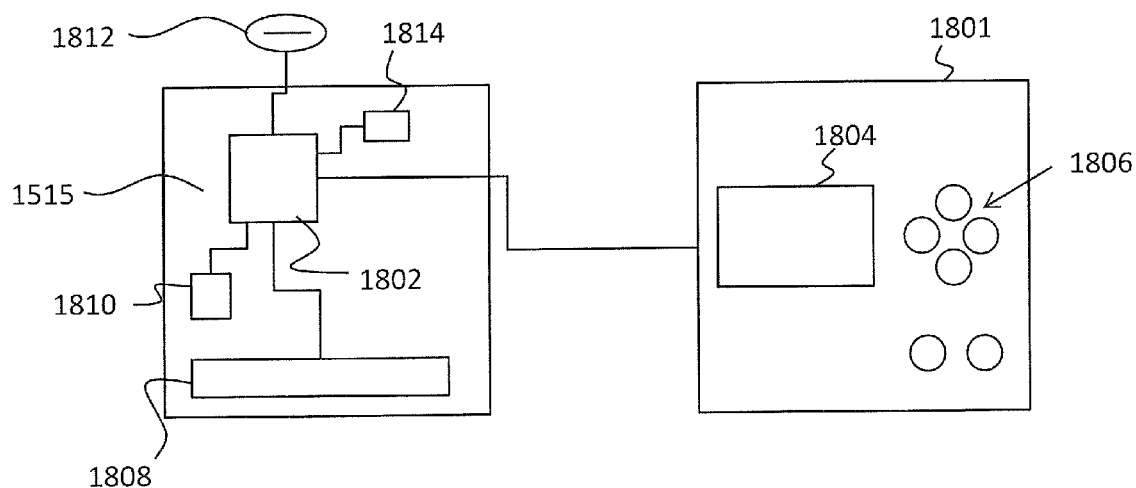
FIG. 18 is a schematic view of a driver/controller circuit communicatively coupled to a user interface of a lighting-assembly in accordance with the present invention.

FIG. 18 illustrates an exemplary embodiment of the driver/controller circuit 1515. In the embodiment shown, the driver/controller circuit 1515 includes a processor 1802, a memory 1810, a clock 1814, a communication port 1812, and a controller 1808. The processor 1802 is operable to read a set of instructions from a memory 1810 and deliver control signals to the controller 1808. The instructions can be in the form of a program or software application with predefined lighting settings. The controller 1808 receives the control signals from the processor 1802 and, in certain embodiments, is able to individually address each of the plurality of LED light sources. In other embodiments, the array of LED light sources acts as a single bulb and the controller 1808 causes the entire array of LED light sources to energize as desired.

A user interface 1801 is communicatively coupled to the driver/controller circuit 1515. The user interface 1801 includes a display 1804 and a plurality of user inputs 1806. In accordance with the present invention, the inventive light assembly 300 is fully programmable through the user interface 1801 or through one or more communication ports 1812, e.g., USB, coupled to the processor 1802 and/or memory 1810. In other embodiments, the light assembly 300 is operable wirelessly, using a WiFi network, for example, or other systems utilizing radio waves. The assembly 300 may also be operable through use of data applications of mobile devices.

Through use of the user interface 1801, and in particular, the user inputs 1806 and the display 1804, the user can configure the lighting assembly 300 to produce one of many available lighting effects, such as emergency vehicle emergency lights, fire, water, lightning, shadows cast by televisions, and many more. Settings that contribute toward creating a specific effect include a temperature adjustment, a color correction adjustment, a color adjustment, a white adjustment, a frequency adjustment, a duty cycle adjustment, and more.

A temperature adjustment, which adjusts the white temperature level from, for example, about 3200 to about 6800 Kelvin in approximately 10 degree increments and be determined by a user through the user interface 1801 or port 1812. Exemplary preset values are MAX=5600, MIN=3200. A configurable master adjustment adjusts the LED level for all LEDs from about 0-100%. Exemplary preset values of the master adjustment are MAX=100, MIN=0. A color correction adjustment applies either a green or magenta offset to the white light to adjust the color to the desired whiteness value from about −8 to 8, although other values are acceptable. Exemplary preset values of the color correction adjustment are MAX=8, MIN=−8. A color adjustment adjusts the LED level for all color LEDs (Red, Green, Blue, and Amber) from about 0-100%. Exemplary preset values of the color adjustment are MAX=100, MIN=0. A white adjustment adjusts the LED level for the white LEDs from about 0-100%. Exemplary preset values of the white adjustment are about MAX=100, MIN=0. An effect selector selects the effect for the lighting assembly to produce. Several, but not all, exemplary effects are described below. The frequency selector can be used to adjust the cycle time of the selected effect from about 0.01-5.0 seconds, although other values are acceptable. An exemplary available frequency selection range varies from about a maximum of 100 and a minimum of 0. The duty cycle selector can be used to adjust the Duty cycle for the selected effect from about 1-100%. Exemplary preset values of the duty cycle selector are about MAX=100, MIN=1.

The table below provides several exemplary special-effects settings, a description of each, and exemplary setting values.

| Effect | Description | Initial settings |
|---|---|---|
| None | All LEDs off | White = 0<br>Red = 0<br>Green = 0<br>Blue = 0<br>Amber = 0<br>Temperature = 5600<br>Frequency = 0.5<br>Duty = 20 |
| Strobe | Flash selected LEDs at the selected duty cycle and frequency. | White = 100<br>Red = 0<br>Green = 0<br>Blue = 0<br>Amber = 0<br>Temperature = 5600<br>Frequency = 0.5<br>Duty = 20 |
| Chase 1 | Cycles through the red, green, blue, and amber LEDs at the selected frequency with a fade on and off for each LED. | White = 0<br>Red = 100<br>Green = 100<br>Blue = 100<br>Amber = 100<br>Temperature = 5600<br>Frequency = 0.25<br>Duty = 100 |
| Chase 2 | Cycles through the red, green, blue, and amber LEDs at the selected frequency with a hard on and off for each LED. | White = 0<br>Red = 100<br>Green = 100<br>Blue = 100<br>Amber = 100<br>Temperature = 5600<br>Frequency = 0.25<br>Duty = 100 |
| Police Old | Fades the blue LEDs to full on for the first half of the cycle, then sets the blue LEDs to off and sets the red LEDs to full on and fades the red LEDs to off for the second half of the cycle. Cycle time is determined by the Frequency value. | White = 0<br>Red = 100<br>Green = 0<br>Blue = 100<br>Amber = 0<br>Temperature = 5600<br>Frequency = 0.6<br>Duty = 80 |
| Police New | Flashes the blue LEDs four times, then the red LEDs four times for each cycle. Cycle time is determined by the frequency value. | White = 0<br>Red = 100<br>Green = 0<br>Blue = 100<br>Amber = 0<br>Temperature = 5600<br>Frequency = 0.6<br>Duty = 80 |
| Fire Truck Old | Fades the red LEDs to full on for the first half of the cycle, then sets the red LEDs to off and sets the amber LEDs to full on and fades the amber LEDs to off for the second half of the cycle. Cycle time is determined by the Frequency value. | White = 0<br>Red = 100<br>Green = 0<br>Blue = 0<br>Amber = 100<br>Temperature = 5600<br>Frequency = 0.6<br>Duty = 80 |
| Fire Truck New | Flashes the red LEDs four times, then the amber LEDs four times for each cycle. Cycle time is determined by the frequency value. | White = 0<br>Red = 100<br>Green = 0<br>Blue = 0<br>Amber = 100<br>Temperature = 5600<br>Frequency = 0.6<br>Duty = 80 |
| Ambulance Old | Fades the red LEDs to full on for the first half of the cycle, then sets the red LEDs to off and sets the white LEDs to full on and fades the white LEDs to off for the second half of the cycle. Cycle time is determined by the frequency value. | White = 50<br>Red = 100<br>Green = 0<br>Blue = 0<br>Amber = 0<br>Temperature = 3600<br>Frequency = 0.6<br>Duty = 80 |
| Ambulance New | Flashes the red LEDs four times, then the white LEDs four times for each cycle. Cycle time is determined by the frequency value. | White = 50<br>Red = 100<br>Green = 0<br>Blue = 0<br>Amber = 0<br>Temperature = 3600<br>Frequency = 0.6<br>Duty = 80 |
| Fire/Candle | Random settings of the red and amber LEDs to produce a flickering effect simulating a fire or candle. Flickering frequency is determined by the Frequency value. | White = 0<br>Red = 100<br>Green = 0<br>Blue = 0<br>Amber = 100<br>Temperature = 3600<br>Frequency = 0.15<br>Duty = 100 |
| Water | Blue with pulsing white. | White = 50<br>Red = 0<br>Green = 0<br>Blue = 100<br>Amber = 0<br>Temperature = 3600<br>Frequency = 4.0<br>Duty = 100 |
| TV | Alternating shades of White to emulate a TV changing scenes. | White = 50<br>Red = 0<br>Green = 0<br>Blue = 100<br>Amber = 100<br>Temperature = 3600<br>Frequency = 1.25<br>Duty = 100 |
| Lightning | Random flashes of high intensity White light. | White = 100<br>Red = 0<br>Green = 0<br>Blue = 100<br>Amber = 0<br>Temperature = 5600<br>Frequency = 1.5<br>Duty = 100 |

Color Correction can be applied by calculating the green or magenta level needed to adjust the White color. This allows the user to shift the white light to either green or magenta for their application. It has been determined that a negative value on the color correction, for example, −1 to −8, will apply a magenta level. This is done by applying the blue and red LEDs with increasing brightness to change the white light output. The value applied is proportional to the white light intensity, so if the white light is at a low setting the color correction may not have any effect. The following table shows exemplary percentages for the red and blue LEDs with the white LEDs set to 100%:

| Color Correction Value | Blue Percentage | Red Percentage |
| --- | --- | --- |
| −1 | 4 | 4 |
| −2 | 8 | 8 |
| −3 | 12 | 12 |
| −4 | 16 | 16 |
| −5 | 20 | 20 |
| −6 | 24 | 24 |
| −7 | 28 | 28 |
| −8 | 32 | 32 |

A positive value on the color correction, 1 to 8, will apply a green level. This is done by applying green LEDs with increasing brightness to change the white light output. The value applied is proportional to the white light intensity, so if the white light is at a low setting the color correction may not have any effect. The following table shows the percentage for the green LEDs with the white LEDs set to 100%:

| Color Correction Value | Green Percentage |
| --- | --- |
| 1 | 4 |
| 2 | 8 |
| 3 | 12 |
| 4 | 16 |
| 5 | 20 |
| 6 | 24 |
| 7 | 28 |
| 8 | 32 |

Although far superior to traditional light-bulbs, LEDs also generate heat when turned on for extending periods of time or when there are multiple LEDs turned on at one time. Generally, in order to achieve the optimum lifespan, LEDs should be exposed to an environment with relatively cool air. Prior-art lighting devices utilize one or more electric fans to force air into the body of the light, across the heat-generating components, and out a series of vents provided usually on all sides of the light body. Unfortunately, the electric fans utilize a considerable amount of electrical energy and it has been found that fluid dynamics controlling the flow of air into and out of the body results in a considerable amount of turbulence that pushes back and resists the input of fresh air into the body. This resistance is a further waste of energy and the cooling effect is not efficient on the components inside the light body. Embodiments of the present invention provide vents on only an upper side and a lower side of the light body and eliminate the need for an electric fan or any other type of active air introduction device. Embodiments of the present invention advantageously utilize the principles of physics to accomplish an improved cooling effect on the components within the light body.

FIG. 19 illustrates a side elevational partial view of a lighting-assembly 1902 featuring straight light-guides 1904a-n aligned and mated with an adjacent light-source assembly 1906a-n in accordance with the present invention. As previously discussed, FIG. 19 also illustrates the light guides having cores 1900a-n within the recessed portions 1908a-n at the end 1910 of the light-guides 1904a-n. The cores 1900a-n may also have an aperture sized to receive the end of the light-source assembly 1906a-n. Similar to FIG. 3, at the distal end 1912 of the light-guides 1904a-n is the receiving surface 318 of the light-emitting lens 316.

Figure 15:
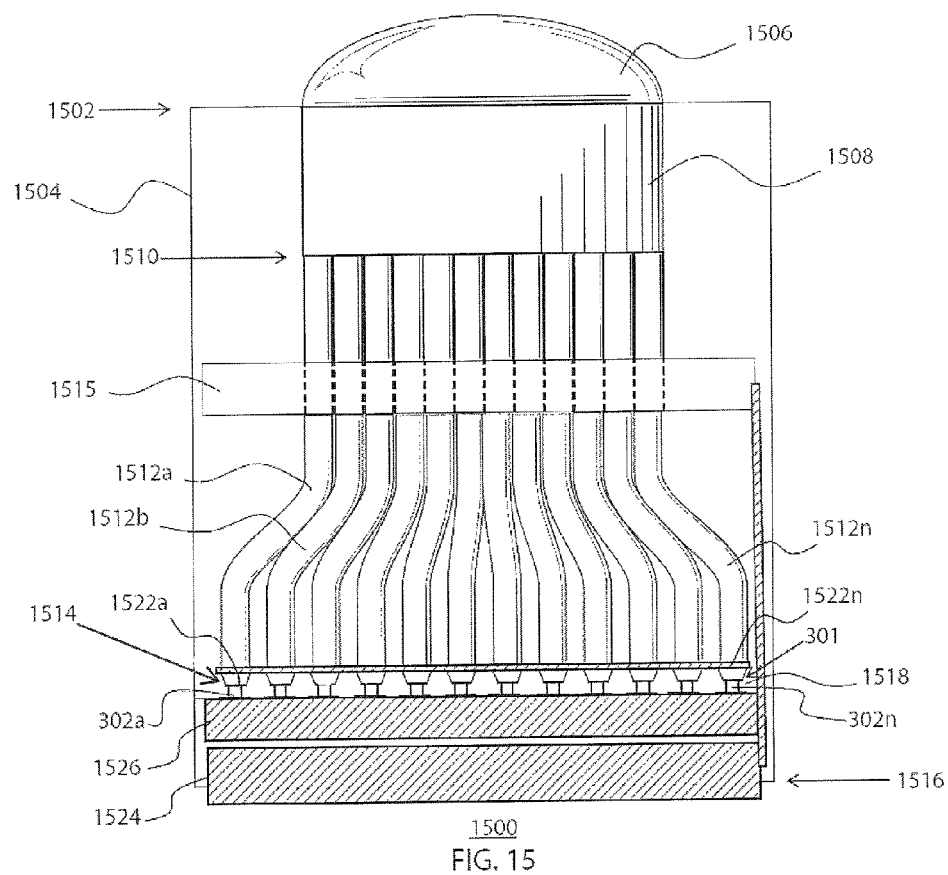
FIG. 15 is a side elevational, cross-sectional, view of a lighting-assembly where a light-source assembly is located in a proximal portion of the lighting-assembly, a lens is located in a distal portion of the lighting-assembly, and a driver/controller circuit is disposed between the light-source assembly and the lens in accordance with an exemplary embodiment of the present invention.
Figure 20:
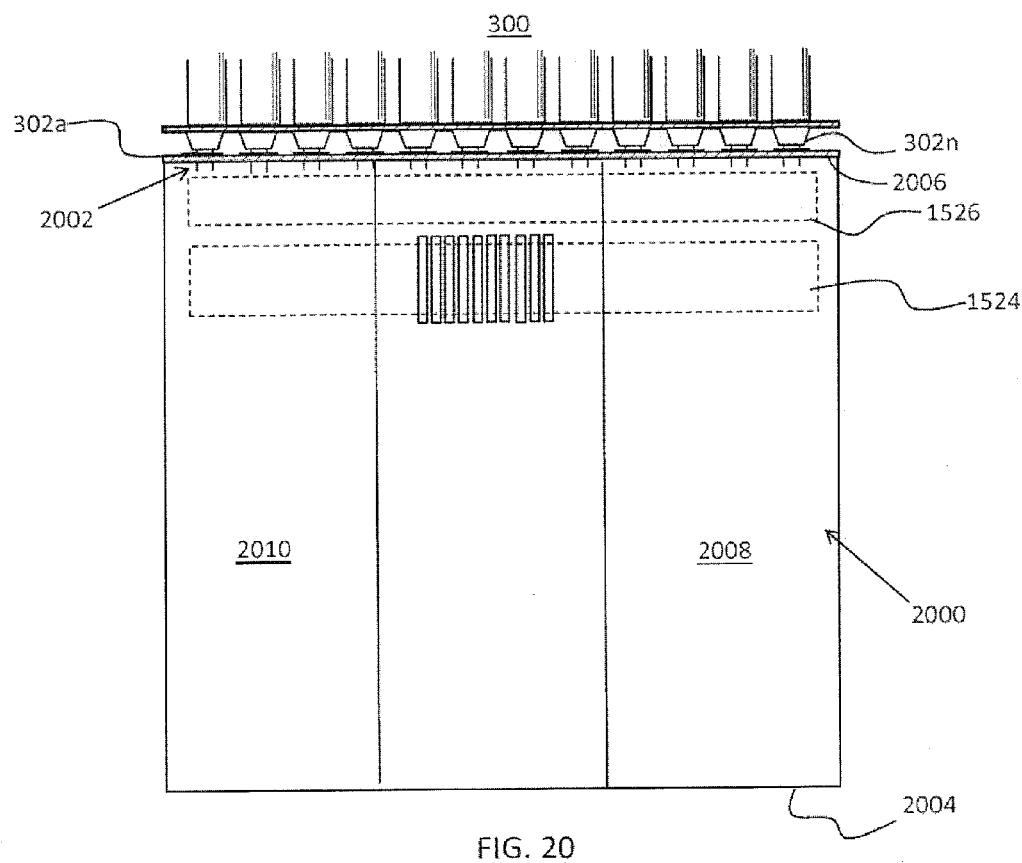
FIG. 20 is a side elevational, cross-sectional, partial view of a light-source assembly of a proximal portion of the lighting-assembly is coupled to a heat sink surrounded by a LED light casing in accordance with an exemplary embodiment of the present invention.
Figure 21:
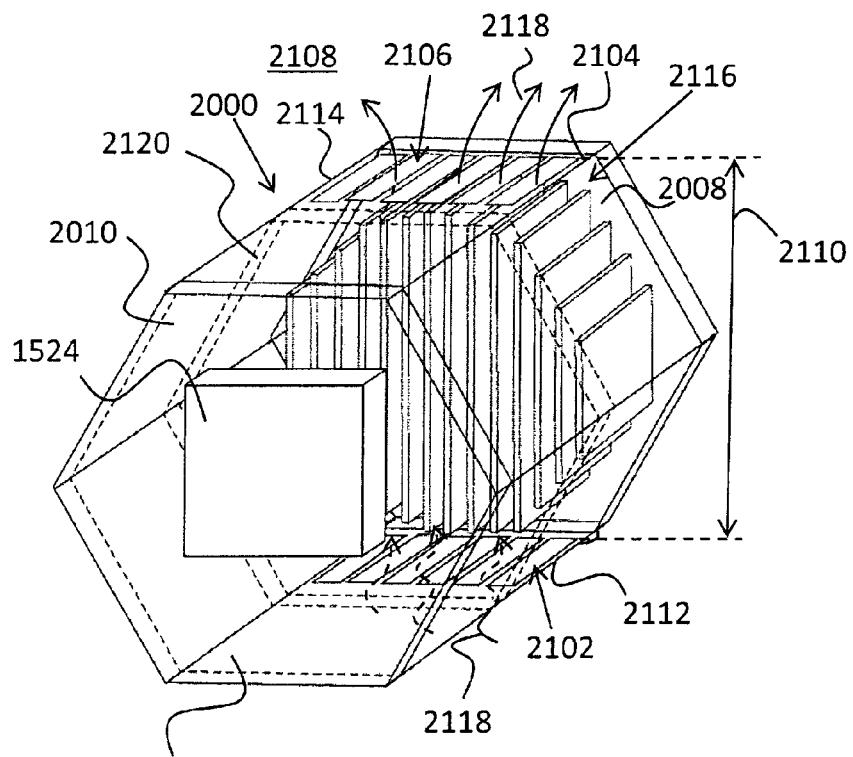
FIG. 21 is a perspective, cross-sectional, view of a lighting-assembly contained within a LED light casing in accordance with an exemplary embodiment of the present invention.

FIG. 20 illustrates a further exemplary embodiment of the present invention. As previously discussed, one embodiment of the present invention includes a heat sink 1526 coupled to the LED light sources 302a-n as shown in FIG. 15. This advantageously allows those heat-producing components to be placed in the back of the assembly 1500 where they can be effectively cooled. As the heat sink 1526, power supply 1524, and, potentially, the driver/controller circuit 1515 all generate heat, the embodiment shown in FIGS. 20 and 21 illustrate an effective and efficient way of dissipating the heat that is generated. In one embodiment, the LED light casing 2000 houses at least one portion 2002 of the light sources 302a-n, particularly a portion that generates heat. The housing assembly 2000 has a first end 2004 and a second end 2006 that is substantially enclosed. The term "substantially encloses" or "substantially enclosed" as used herein, unless otherwise stated, means completely, or with small opening(s) less than one-half inch of the opening's smallest diameter, surrounding a referenced object, plane, surface or material.

To further prevent air from escaping, the LED light casing 2000 also has a right upper face 2008 and a left upper face 2010, which are also substantially enclosed. The left and right lower sides of the casing 2000 are partially hidden in FIG. 20 and may also be substantially enclosed as well. Now, referring to FIG. 21, a perspective cross-sectional downward-looking view of the assembly 2000 of FIG. 20 is shown in accordance with an embodiment of the present invention. The LED light casing 2000 has a substantially enclosed lower portion 2100 defining a lower aperture 2102 for air to pass through. The LED light casing 2000 also has a substantially enclosed upper portion 2104, opposite the lower portion 2100, defining an upper aperture 2106. The lower and upper apertures 2102, 2106 create openings sufficient to allow air to enter and exit, respectively, and form part of a heat-dissipating air-flow engine. In contrast to electric fans, which are noisy, waste energy, add cost, add failure rates, and create turbulent air flow within an enclosed light assembly, thereby causing inefficient cooling, the present invention advantageously removes generated heat from components without the need or use of fans or blowers. As with most electric components, removing the heat prolongs the life of the components inside of the LED light casing 2000, especially those sensitive to heat, such as LED bulbs, circuits, and/or control boards.

To achieve the effective cooling, the LED light casing 2000 is substantially enclosed on all sides and ends, except for two portions, e.g., the lower and upper apertures 2102, 2106, opposite each other, where it is desired for air to flow at a certain velocity. As the LED light casing 2000 is substantially enclosed, except for the apertures 2002, 2006, a pressure difference is created between the heated air inside of the LED light casing 2000 and the outside cooler ambient air 2108. The heat within the LED light casing 2000 is removed by a constant stream of cool air that is driven through the device by a novel heat-dissipating air engine created by the lower and upper apertures 2102, 2106. This movement of air is referred to herein as the "chimney effect" and is illustrated in connection with the lighting assembly 300 shown in FIG. 3. Never before has a commercial studio light, such as that depicted in FIG. 21, been sufficiently cooled without the use of a fan or any other active cooling device.

Still referring to FIG. 21, when heat is generated by the LED light sources 302a-n or other heat generating components inside the LED light casing 2000, the temperature of the air enclosed within the casing 2000 is greater than the ambient air 2108 temperature outside the casing 2000. The increase in air temperature has an inversely-proportional correlation to the density of the corresponding air. As such, not only does the hotter, less dense, air rise through the upper aperture 2106, but a pressure difference is created between the higher pressure outside ambient air 2108 and the lower pressure enclosed air. The increase in temperature, in combination with a height 2110 separating the upper aperture(s) 2106 and lower aperture(s) 2102, generates a flux of cooler air generally known as the aforementioned, "chimney effect." The overall rate of flow is a function of the temperature inside of the casing 2000, the enclosed area inside the casing 2000, the size of the apertures 2102, 2106, and the height 2110 separating those apertures.

In one embodiment, there will be one or more apertures on the lowest extent 2112 of the lower portion 2100 or the highest extent 2114 of the upper portion 2104. In other embodiments, the apertures may be located on an upper portion 2116 of the sides 2008, 2010. In one embodiment, to maximize heat transfer from heat sink and/or the LED light sources 302a-n, the apertures 2102, 2106 are substantially collinear, or having two points lying along a straight line, or within one inch displaced from one another. In other embodiments, the apertures 2102, 2106 may be offset and located in different locations on the casing 2000. There may also be more than one set of apertures which further facilitate in the creation of other airflows that cool other components of the lighting assembly 300.

Although never before thought possible, as FIG. 21 illustrates, the air flow created by the novel heat-dissipating air-flow engine, represented with arrows 2118, efficiently removes heat dissipated from the heat sink 1526 and other components within the casing 2000. In one embodiment, the casing 2000 may include a portion of the light sources 302a-n. In other embodiments, the casing 2000 may include other components desired to be cooled, such as the power supply 1524 or one or more circuit boards. Moreover, an embodiment of the present invention may also include a heat sink coupled to any of the above mentioned components to further reduce the heat generated. The casing 2000 also may include one or more partitions 2120 that are coupled to the side walls of the casing 2000. The partition 2120 may serve the role of restraining the components of the assembly 300 and provides a boundary that directs the flow of air 2118 outwardly through the top vent 2106. The partition 2120 also facilitates the creation of the temperature difference between the inside of the casing and the outside environment that is a driving force behind the air exchange rate.

Figure 22:
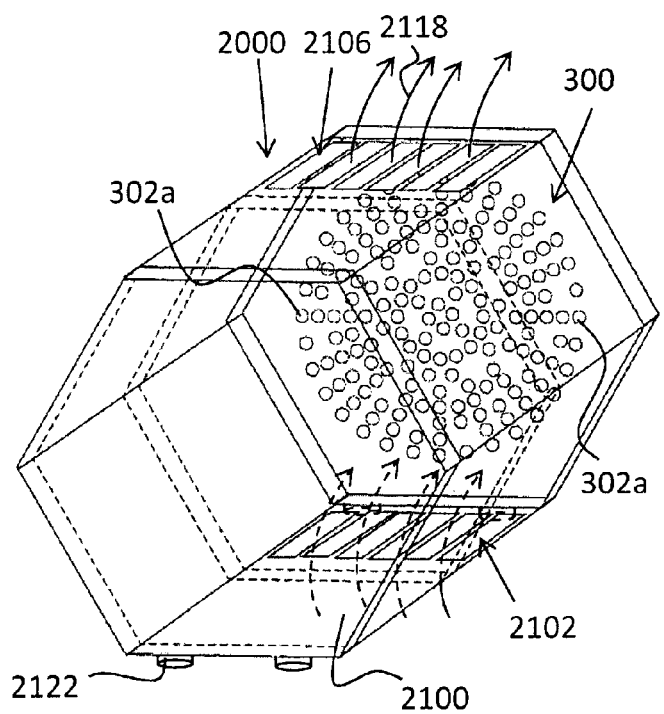
FIG. 22 is a perspective, partially hidden, view of a hexagon-shaped light-assembly housing with air vents in a bottom surface and a top surface, the air vents collectively pulling and pushing, respectively, air through the light-assembly housing in accordance with an exemplary embodiment of the present invention.

In one embodiment, shown in FIG. 22, the light-assembly casing/housing 2200 is shaped in the form of a hexagon. In other embodiments, the light-assembly housing 2200 may be formed in various shapes and sizes, and may have various components connected thereto. The side walls of the light-assembly housing 2000 are also shown as being substantially enclosed, while the top and the bottom walls have apertures 2202 that, through the chimney effect described above, pull cooler air, represented with arrows 2204, from the bottom of the housing 2200, through the interior, across the components therein, and out through the top. FIG. 22 also illustrates the assembly 300 with the heat sink 1526 removed, revealing the end of the plurality of light sources 302a-n which generates the majority of heat. The casing 2000, which includes the light assembly 300, may have legs 2122 that assist the casing 2000 in standing upright. The legs 2122 also position casing 2000 where the upper aperture 2106 is at a higher altitude above the lower aperture 2102 in order to facilitate the removal of heat from the light assembly 300.

Further embodiments of the present invention also provide a novel and efficient self-cooled lighting assembly that removes the heat generated from one or more light bulb assemblies by exposing those heating generating portions of the light bulb assemblies to airflow produced by a novel heat-dissipating air engine. Embodiments of the invention also provide that the self-cooled light assembly may be built into a pre-existing structure that creates ventilation from a novel heat-dissipating engine when at least one light emitting source is inserted therein, and in operation. In further embodiments of the present invention, the light assembly has a light bulb assembly with an airflow chamber coupled thereto and is portable to be removably-couplable a standard-sized light bulb port and creating a chimney effect when the light bulb assembly is in operation.

Figure 23:
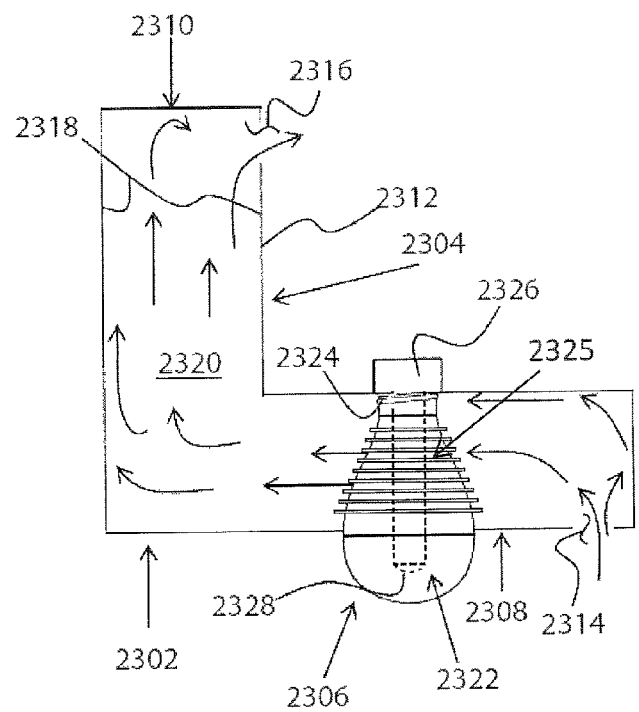
FIG. 23 is a side elevational, cross-sectional, view of a self-cooled lighting assembly with a light-bulb assembly placed at least partially within an airflow channel defined by an airflow chamber in accordance with one exemplary embodiment of the present invention.

Referring now to FIG. 23, one embodiment of the present invention is shown in an elevational cross-sectional front view. FIG. 23 shows several advantageous features of the present invention, but, as will be described below, the invention can be provided in several shapes, sizes, combinations of features and components, and varying numbers and functions of the components. As shown in FIG. 23, the first example of a self-cooled lighting assembly 2300 is shown being applied to a pre-existing structure, such as a wall or ceiling 2302 of a building. Although the present invention may be applied to virtually any light emitting source encapsulated in a bulb-like structure, for the ease of the reader, the lighting assembly 2300 will be discussed with reference to one or more LED light sources. In other embodiments, the pre-existing structure is a lamp, a vehicle, or other similar structure with a power source sufficient to supply power to the light assembly 2300. The assembly 2300, in its basic form includes an airflow chamber 2304 and a light bulb assembly 2306, also referred to herein as a LED assembly, which is coupled to the airflow chamber 2304.

Figure 2:
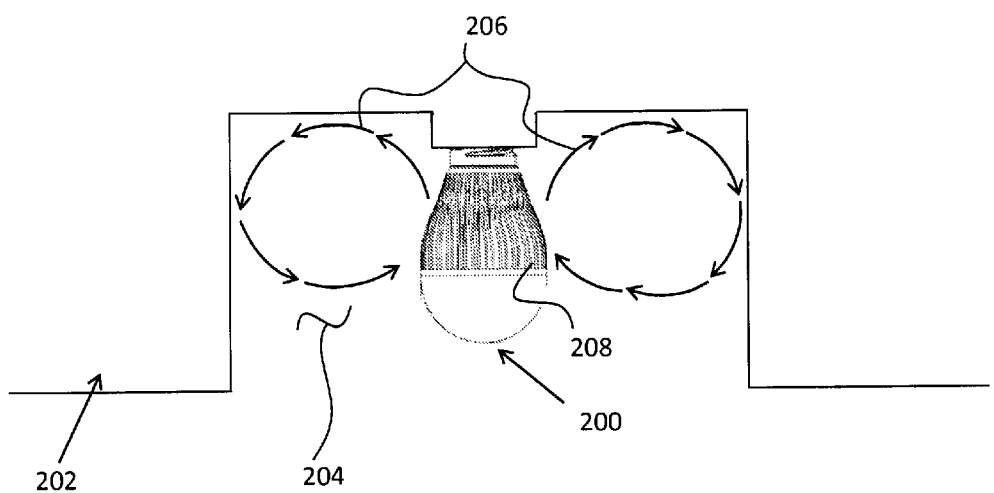
FIG. 2 is a front elevational view of a prior-art LED light assembly recessed within a wall ceiling.

The airflow chamber 2304 has a first end 2308 and a second end 2310 opposite to the first end 2308. In one embodiment, the airflow chamber 2304 may be formed in the general circular shape. In other embodiments, however, the chamber 2304 may be formed in various other shapes sufficient to enclose and transport the air within. Separating the first and second ends 2308, 2310 is a side wall 2312. In one embodiment, the side wall 2312 extends horizontally and vertically and may include portions of the ceiling 2302, as shown in FIG. 23. In other embodiments, the side wall 2312 may extend vertically, at an angle, or may extend in a variety of directions. The side wall 2312 is shown defining a first opening 2314 and a second opening 2316 that is in fluid communication with an outside environment, e.g., air. The outside environment varies depending on the location of the assembly 2300, but may include the inside room of a house, the attic, a ceiling space, or the outside atmospheric air. When the assembly 2300 is in operation and confined within a small enclosed space, as shown in FIG. 2, the first opening 2314 should be placed directly toward the larger area of cool air and away from any obstructions that would inhibit the intake of air.

Furthermore, when the assembly 2300 is in operation, as shown in FIG. 23, the second opening 2316, also referred to as the distal opening, releases the air upwardly through the walls or spaces of the home where it is subsequently expelled into the environment outside of the home. The first opening 2314, also referred to as the proximal opening, intakes air from the room of the home where the assembly 2300 is located. Although FIG. 23 illustrates the side wall 2312 completely defining the first and second openings 2314, 2316, in other embodiments, the side wall 2312 at least partially defines the first and second openings 2314, 2316. To achieve the desired flow across one or more portions of the LED assembly 2306, the second opening 2316 is downstream to the first opening 2314.

Figure 25:
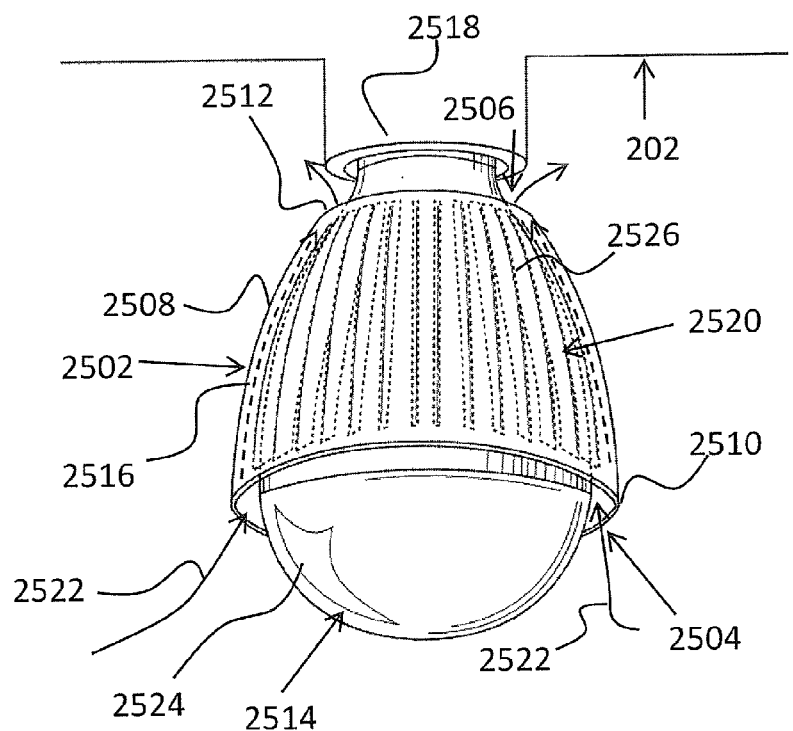
FIG. 25 is a side elevational, cross-sectional, view of a self-cooled lighting assembly coupled to a standard-sized light bulb outlet with a light-bulb assembly subjected to a stream of air entering a first opening and exiting a second opening in accordance with an embodiment of the present invention.

As previously mentioned, the flow of air generated by the novel heat-dissipating engine of the present invention is a function of height between at least two openings, the average area of the openings, the average volume of an airflow channel 2320 defined by the airflow chamber 2304, and the temperature difference between the average temperature of the airflow channel 2320 and the temperature outside of the chamber 2304. More specifically, the side wall 2312 includes an inner surface 2318 which defines the airflow channel 2320. As shown, the inner surface 2318 completely defines the airflow channel 2320. In other embodiments, the inner surface 2318 at least partially defines the airflow channel 2320 as one or more portions of the LED assembly 2306 may also define the airflow channel 2320, as shown in FIG. 25. Contrary to all known modes of simply placing an LED lighting assembly in an environment and letting heat randomly dissipate, now, for the first time, and in accordance with one embodiment of the present invention, the LED assembly 2306 is continually cooled by an organized steady stream of air. This stream of cool air is provided without the use of external devices, which generally produce heat and require electricity themselves, thereby creating an efficient and effective cooling process.

The LED assembly 2306, more specifically, at least one light emitting source 2322, also referred to herein as at least one LED light source 2322, is also shown at least partially placed within the airflow channel 2320 such that it can be said to be thermally coupled to the channel 2320. As the LED light source 2322 generates heat and is also one of the components that is a focal point of novelty in another embodiment, the at least one LED light source 2322 may be placed entirely within the airflow channel 2320. In other embodiments, the light source 2322 may have one or more heat sinks 2325 attached thereto to facilitate heat transfer, as described above. As the light source 2322 may have one or more heat conducting materials coupled thereto, such as the heat sink 2325, the light source 2322 would still be considered at least partially within the airflow channel 2320 or, at a minimum, thermally coupled to the airflow channel 2320. Stated another way, as long as heat generated from the at least one light source 2322 is transferred to the airflow channel 2320, the light source 2322 is said to be thermally coupled to the channel 2320 in accordance with the present invention.

Still referring to FIG. 23, the LED light source 2322 is shown with an electrical contact portion 2324 that is disposed for attachment to an electrical source 2326. In embodiments where one or more LEDs are used, a diode 2328, or other light emitting source, is in electrical communication with the electrical contact portion 2324. In one embodiment, the electrical contact portion 2324 is a metallic base that is adapted to couple to standard electrical lighting outlet. The electrical source 2326 also includes the aforementioned outlet. In other embodiments, the contact portion 2324 may be in the form of any male portion of a male/female attachment, or other similar attachment, sufficient to transfer electricity from the electrical source 2326 to the diode 2328, or other light emitting source. Further, the electrical source 2326 may include any female portion of a male/female attachment, or other similar attachment, sufficient to transfer electricity to the diode 2328. In one embodiment, the electrical source 2326 may generate alternating current (AC) sufficient to power the LED assembly 2306. In other embodiments, the electrical source 2326 may generate direct current (DC) to the LED assembly 2306 sufficient to power the assembly 2306.

When the light source 2322 is supplied electricity, energy, in the form of heat and light, is released. This heat, in combination with the heat from any other components, such as a power source and/or a circuit board/controller, is transferred to the adjacent air within the channel 2320. As the air within the channel 2320 is heated, it becomes less dense than the outside environmental air and therefore rises as the result of the buoyancy force. As the hot air is displaced, the cooler, denser, air enters and passes by the heating elements of the LED assembly 2306. At the same time, the air within the channel 2320 and the atmospheric pressure are unequal, such that the high-pressure air within the channel 2320 seeks the low-pressure outside environment. As a result of this pressure difference, a flow is induced, which in turn provides and maintains the LED assembly 2306 at a lower temperature than those LED assemblies presently available in the prior-art, without the use of other devices, such as fans. The term "fan," as used herein, is intended to generically describe any device with a moving element that forces a movement of air across some distance.

In one embodiment, the airflow chamber 2304, which may include the side wall 2312 or the first or second ends 2308, 2310, surround and enclose the heat generating portions of the LED assembly 2306 so there are substantially no air leaks in the airflow channel 2320. This may be accomplished by gaskets or another malleable medium that may be inserted between the LED assembly 2306 and chamber 2304. In other embodiments, one or more portions of the chamber 2304 adjacent to the LED assembly may be open to allow air to flow in, but is sufficient to still generate and maintain a flux of airflow.

Figure 24:
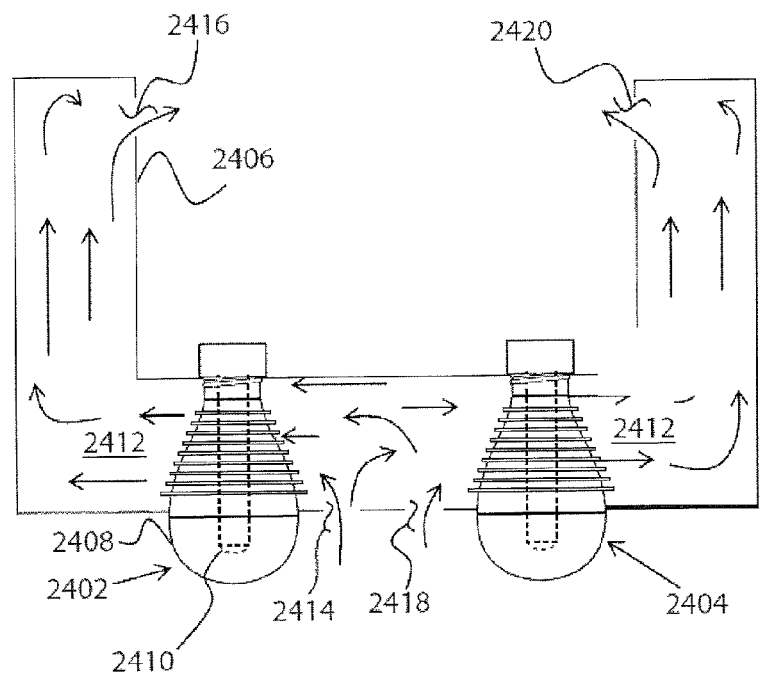
FIG. 24 is a side elevational, cross-sectional, view of a self-cooled lighting assembly with two light-bulb assemblies placed at least partially within an airflow channel defined by an airflow chamber in accordance with another embodiment of the present invention.

FIG. 24 illustrates another embodiment of the LED light assembly 2400, with two LED assemblies 2402, 2404 coupled to the airflow chamber 2406. FIG. 24 shows the diverse and novel applications of the present invention. Similar to FIG. 23, and taking assembly 2402 as an example, the assembly 2402 has a light case 2408 which includes a portion of the diode 2410, or other light emitting source that may be utilized. The case 2408 prevents degradation of the light generated from the diode 2410 should the diode 2410 be completely or partially placed within the airflow channel 2412. In one embodiment, the light case 2408 is placed partially or completely within the airflow channel 2412. In such instances, the case 2408, when the LED assembly 2402 is in operation, may receive transient airflow over the surface of the case 2408 or, as shown in FIG. 25, may define one or more portions of the airflow channel 2412. In further embodiments, the case 2408 is coupled to an outside surface of the chamber 2406 and not placed within the channel 2412.

In addition to the first and second openings 2414, 2416 supplying and expelling the air that drives the cooling process, the present invention anticipates that more than one opening at each end may be used. For example, in the configuration shown in FIG. 24, the two lower openings 2414, 2418 intake the outside air, while two upper openings 2416, 2420 allow the air to exit. As such, each LED assembly 2402, 2404 is cooled primarily by an induced flow created by all of the openings 2414, 2416, 2418, 2420. In other embodiments, the configuration of the airflow channel 2406 is similar to FIG. 23, and more than one LED assembly 2402 is placed within the airflow channel 2406. Stated another way, there may be multiple LED assemblies being cooled from at least two openings 2314, 2316 defined by the airflow chamber 2304.

Now referring to FIG. 25, another embodiment of the present invention is shown from an elevational, partially cross-sectional, side view. The airflow chamber 2502 of the LED cooling assembly 2500 has first and second ends 2504, 2506 with the side wall 2508 separating those ends 2504, 2506. When compared to the side wall 2312 shown in FIG. 23, the side wall 2508 of FIG. 25 only partially defines the first and second openings 2510, 2512. The LED assembly 2514 also partially defines the first and second openings 2510, 2512 along with partially defining the airflow channel 2516. In contrast to FIG. 23, where the assembly 2300 is formed within a ceiling 2302 or other structure, the assembly 2500 of FIG. 25 is portable and may be coupled to a standard-sized light bulb outlet 2518.

In one embodiment, the side wall 2508 is substantially enclosed. With the side wall 2508 substantially enclosed, the assembly 2500 continually produces a constant flow of air across the LED assembly 2514. In other embodiments, the side wall 2508 may not be substantially enclosed, but any openings, including the first and second openings 2510, 2512, and height 2600 (shown in FIG. 26) of the side wall 2508 are sized to generate a flow when the LED assembly 2514 is in operation. In one embodiment, the side wall 2508 may have a height 2600 (shown in FIG. 26) of approximately 4-6 inches, with an average inner area 2602 (shown in FIG. 26) of approximately 9 in². The average area 2602 is the difference of an area defined by the side wall 2508 and an area defined by the LED assembly 2514, including any attachments that protrude into the airflow channel 2516, if applicable. In other embodiments, the average area 2602, height 2600, and any potential apertures in the side wall 2508 will vary, and may be more or less than the dimensions listed above.

The LED assembly 2514 may also have one or more heat sinks 2520 attached thereto to effectively dissipate the heat from the light source and any components that are sensitive to heat exposure. The heat sinks 2520 can be seen wrapping around the external surface of the LED assembly 2514. In one embodiment, the heat sink 2520 has a plurality of heat dissipating members 2526, each of those members 2526 with a portion oriented in a general direction of the airflow channel 2516 in which they are placed. When the heat dissipating members 2526 are in the general direction of the airflow channel 2516 they can effectively remove heat from one or more components from which they are attached. For example, as the airflow channel 2516 extends longitudinally upward toward the ceiling 202, as should the heat dissipating members 2526. This allows the members 2526 to expose the most surface area to the airflow generated by the assembly 2500, while at the same time not inhibiting the induced airflow. In other embodiments, the LED assembly 2514 may not have a heat sink 2520 and/or any heat dissipating members 2516, and the flow of air within the airflow channel 2516 passes one or more portions of the LED light source and any other components of the LED assembly 2514 directly. Furthermore, in other embodiments, when the LED assembly 2514 is installed on a vertical surface, as opposed to a horizontal ceiling as shown in FIG. 25, the heat dissipating members 2526 are oriented vertically, and the openings 2510, 2512 are placed in locations that create a height difference sufficient to induce airflow. That height varies depending on the aforementioned areas, but may be similar to those dimensions listed above. In other embodiments, the dimensions may vary.

The light bulb assembly 2514 may be a standard-sized LED assembly, which includes any of those embodiments described herein, including those utilizing light guides, or may be incandescent bulbs, fluorescent bulbs, or other light-emitting bulb that generates heat. Now, a light assembly can advantageously remove those components of the assembly 2500 that generate heat from an environment occupied by the heat produced from those components. Further, any heat generated from those components is effectively and efficiently removed by creating a flow of cooler air from an outside environment, and without the use of external devices, such as fans or blowers. This flow of air, represented by the arrows 2522, is passed by the external surface of the LED assembly 2514, thereby removing the heat generated. In one embodiment, the airflow chamber 2502 is formed as part of one or more portions of the LED assembly 2514, such as the LED light case 2524. In other embodiments, the chamber 2502 is independent to the LED assembly 2514 and is coupled using fastening screws or bolts, adhesives, or other fastening means.

In one embodiment, the airflow chamber 2502 may be made with a durable polymer, such as polystyrene or polyethylene. In other embodiments, the airflow chamber 2502, including those embodiments shown in FIGS. 23 and 24, is made from wood, various metallic-based materials, composites, or other polymers. Further, when applied to the embodiments shown in FIGS. 25 through 27, the polymer may be flexible to allow it to contour to one or more portions of the outer surface of the LED assembly 2514.

Figure 26:
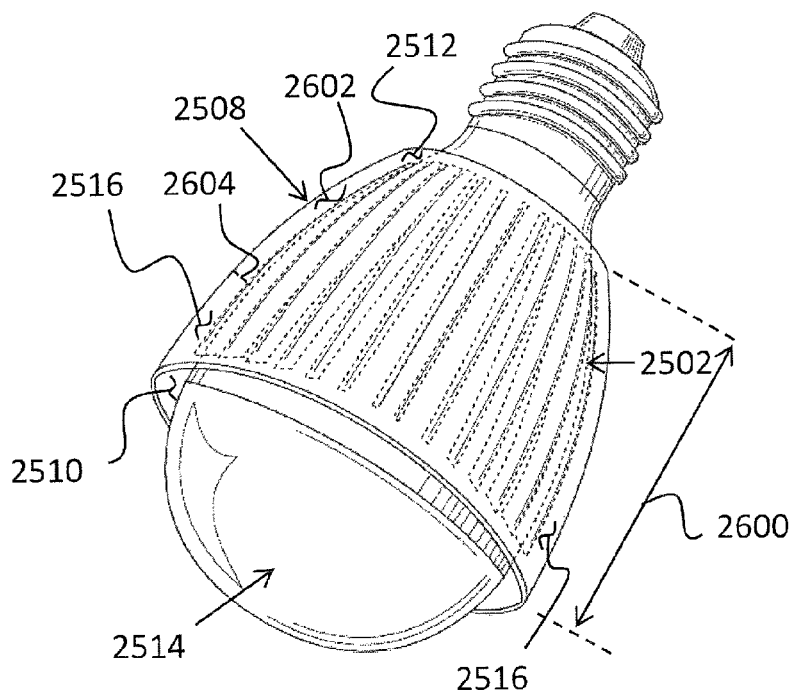
FIG. 26 is a downwardly-looking perspective, partially cross-sectional, view of the self-cooled lighting assembly of FIG. 25 in accordance with an embodiment of the present invention.

Referring to FIG. 26, an additional view of the assembly of FIG. 25 is shown from a downward-looking, partially cross-sectional, perspective view. To create an airflow, as discussed herein, the second opening 2512 is a positive value height 2600 above the first opening 2510. As such, the second opening 2512 will not be any height 2600 value, relative to the first opening 2510, less than zero. Said another way, the second opening 2512 could be said not to be adjacent to, or below, the first opening 2510. It is the placement of the opening 2512 above the opening 2510 that facilitates the creation of the heat-dissipating engine. If the assembly 2500 is rotated into another configuration, such as plugged into a light bulb outlet on floor lamp, the first and second openings 2510, 2512 would be opposite to one-another, i.e. the first opening 2510 would now be the second opening 2512.

Figure 27:
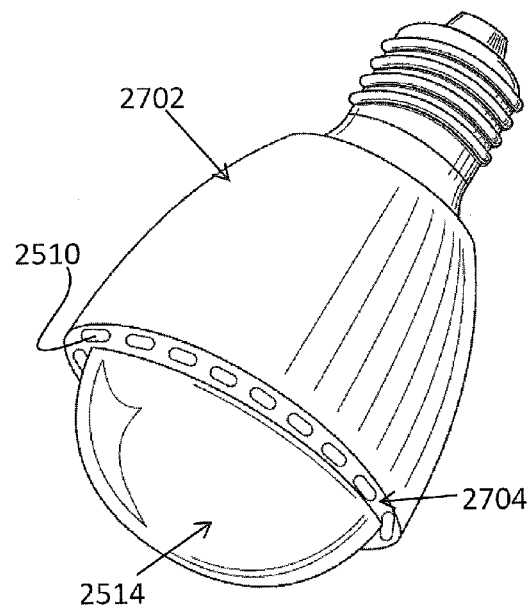
FIG. 27 is a downward-looking perspective view of the self-cooled lighting assembly of FIG. 25 with a portion of the airflow chamber covering portions of the first opening in accordance with another embodiment of the present invention.

FIG. 26 further illustrates how side wall 2508 continually surrounds the outer surface of those heat-generating components of the LED assembly 2514 to minimize air leaks and provide efficient cooling. In other embodiments, the side wall 2508 may still surround the LED assembly 2516, but the airflow channel 2516 may have certain portions obstructed or filled in by material 2604 of the chamber 2502 or the LED assembly 2514. The chamber 2502 may also form a plurality of individual airflow channels 2516 that subject the LED assembly 2514 to a stream of airflow. In other embodiments of the assembly 2700, as shown in FIG. 27, the airflow chamber 2702 may have portions 2704 that extend over the first opening 2510, thereby creating smaller apertures. The second opening 2512 may also be partially covered. Although the assembly 2700 may be downwardly-tapered as shown in FIG. 27, in other embodiments, the assembly 2700 may not have any curvature, may be upwardly-tapered, or any combination of the above.

Figure 28:
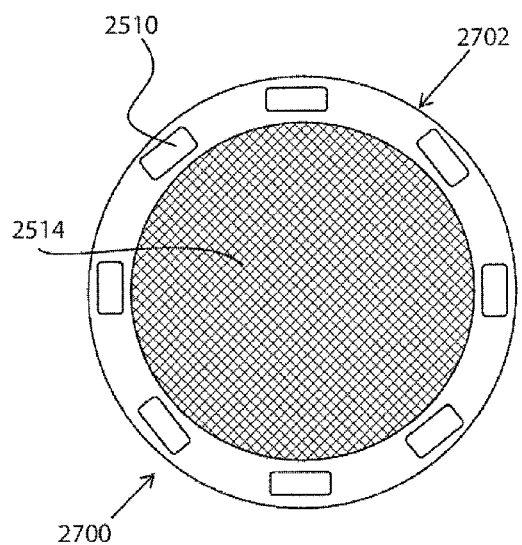
FIG. 28 is a top plan view of the self-cooled lighting assembly of FIG. 27 in accordance with an embodiment of the present invention.
Figure 29:
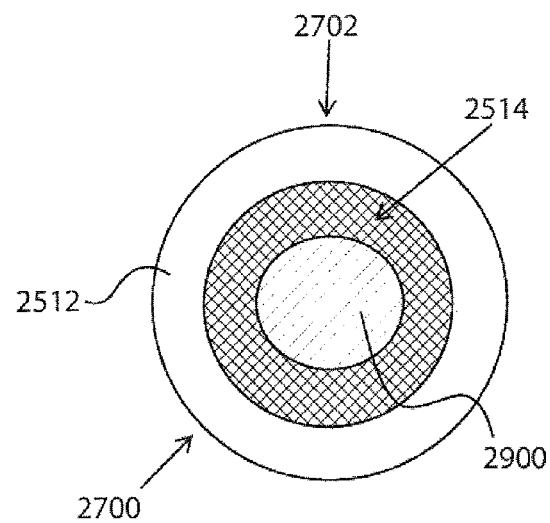
FIG. 29 is a bottom plan view of the self-cooled lighting assembly of FIG. 27 in accordance with an embodiment of the present invention.

FIGS. 28 and 29 illustrate top and bottom plan views of the assembly 2700 of FIG. 27, respectively. The first and second openings 2510, 2512 are shown defined by both the airflow chamber 2702 and the LED assembly 2514. The second opening 2512 may be smaller, or larger than the first opening 2510 depending on the curvature of the chamber 2702 and/or LED assembly 2514. The openings 2510, 2512 may also vary depending on the whether any of the openings 2510, 2512 are partially covered. e.g., the first opening 2510 as shown in FIG. 28. The bottom electrical contact portion 2900 of the LED assembly 2514 can also be seen.

Figure 30:
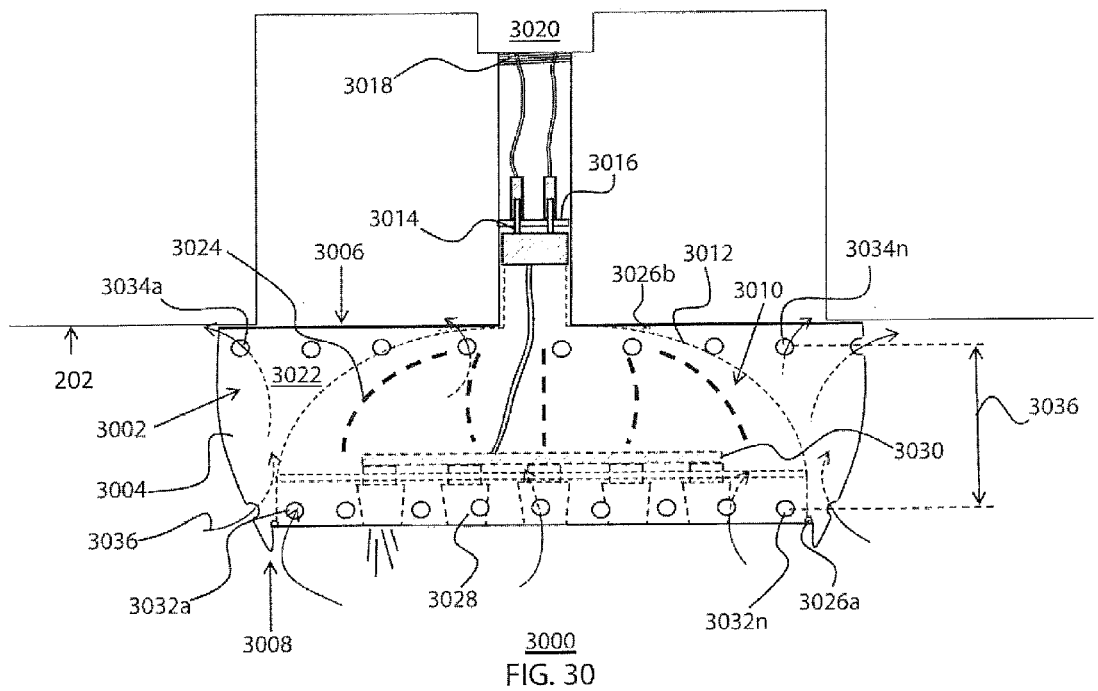
FIG. 30 is a side elevational, cross-sectional, view of a self-cooled lighting assembly in operation that is coupled to a standard-sized light bulb outlet, with a light-bulb assembly that is removably-couplable to airflow chamber and a stream of air entering a plurality of first openings and exiting a plurality of second openings a height above the first openings in accordance with an exemplary embodiment of the present invention.

Now, turning to FIGS. 30 through 33, alternative embodiments of the present invention are shown from elevational, cross-sectional, side views. FIG. 30 similarly illustrates the LED lighting assembly 3000 with the side wall 3004 separating the first and second ends 3006, 3008 of the airflow chamber 3002. The assembly 3000 is shown being adaptable to be placed outside those ceilings 202 formed for traditional recessed lighting systems.

As such, a user may modify those traditional recessed lighting systems with a novel lighting assembly 3000 that may be mounted to be flush with the ceiling 202 and provides efficient and effective cooling to the LED assembly 3010. The LED assembly 3010 is shown outlined with hash-lines 3012 and being placed at least partially within the airflow chamber 3002.

The LED assembly 3010 has a portion 3014 attached to an electrical source 3016. As illustrated, the LED assembly 3010 is removably-couplable to the chamber 3002, which has an electrical lead running to another contact portion 3018 that is screwed into a standard light-bulb outlet 3020. In one embodiment, the chamber 3002 is a single piece of material that is screwed into the light-bulb outlet 3020 until a portion of the first end 3006 couples to the ceiling 202. In other embodiments, the chamber 3002 may translate up and down the shaft that connects to the outlet 3020. The chamber may also be attached on a swivel that allows it to be flush with a ceiling 202 that is at an angle. As the LED assembly 3010 may be removed from the chamber 3002, a user may advantageously change the LED assembly 3010, should it need to be replaced without removing the entire LED lighting assembly 3000. When LED assembly 3010 is attached to the chamber 3002, both the airflow chamber 3002 and the LED assembly create the airflow channel 3022.

The LED assembly 3010 also is shown having one or more heat sinks 3024 attached thereto. To reduce airflow leaks and facilitate the flow of air within the airflow channel 3022, the assembly 3000 has one or more gaskets 3026a, 3026b coupled thereto. In one embodiment, the gaskets 3026a, 3026b, made from a rubber based sealing-type material, surround and engage with the LED assembly 3010 when inserted therein, thereby creating a relatively air-tight seal. In other embodiments, the LED assembly 3010 may have another sealing-type material, the LED assembly 3010 may have the sealing material attached thereto, or the assembly 3000 may not have any sealing-type material.

The LED assembly 3010 has one or more light sources 3028 located therein that broadcast light when in operation. The light sources may have a power supply 3030 or may also have a circuit board/controller (not shown). When in operation, the heat generated from those components, and potentially any other components located therein, is transferred to the airflow channel 3022. The assembly 3000 also has multiple proximal openings 3032a-n and distal openings 3034a-n. The heat generated from the components of the assembly LED assembly 3010 rises, and exits through the distal openings 3034a-n. The internal area of the airflow channel 3022, the average height 3036 between the distal and proximal openings 3032a-n, 3034a-n, and the temperature difference between the airflow channel 3022 and outside ambient environment creates an airflow (represented with arrows 3038) within the channel 3022. As previously discussed, this creates a heat dissipating engine that displaces the hot air with cooler air. This airflow transports the heat away from those internal components, thereby generating and maintaining a relatively cool environment, not achieved with those prior-art lighting assemblies.

Figure 31:
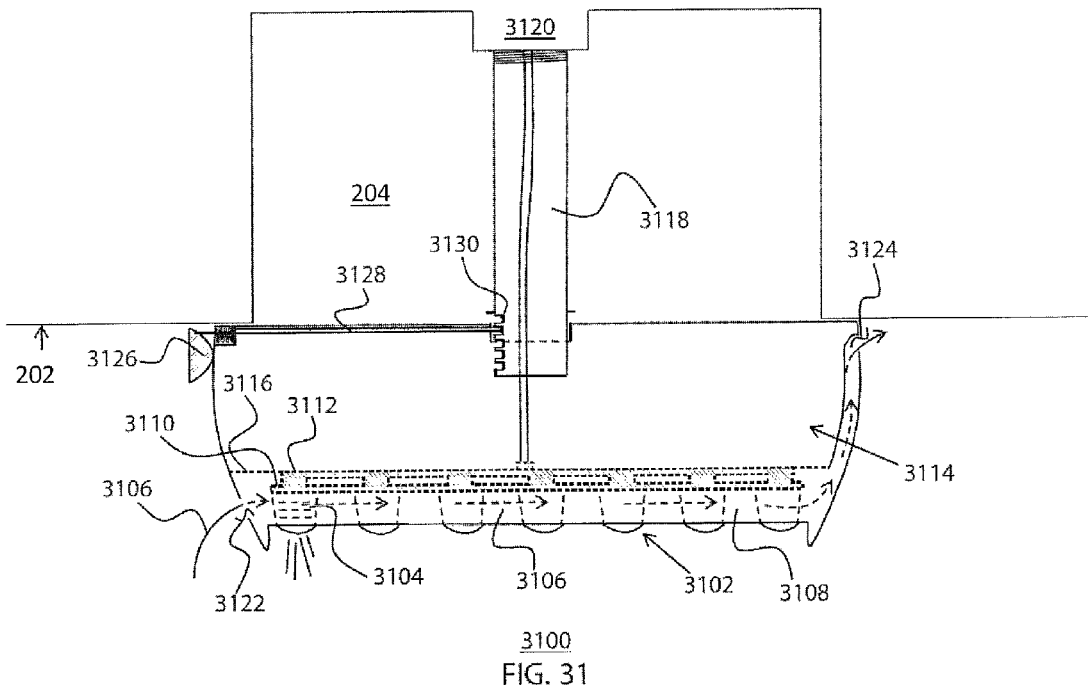
FIG. 31 is a side elevational, cross-sectional, view of a self-cooled lighting assembly in operation that is coupled to a standard-sized light bulb outlet, with the assembly being adjustable in accordance with an embodiment of the present invention.

FIG. 31 illustrates another embodiment of the LED lighting assembly 3100. The assembly 3100 has an LED assembly 3102 with multiple light sources 3104 within that have a portion subjected to airflow (represented with arrows 3106) within the airflow channel 3108. In one embodiment, the airflow chamber 3114 may form one single channel 3108 that subjects all of the light sources 3104 to the airflow. In other embodiments, the airflow chamber 3114 may section into multiple chambers 3114 that define a plurality of individual airflow channels 3108 that subject the airflow to one or more LED light sources 3104. FIG. 31 also shows the LED assembly 3102 with a power supply 3112 and a circuit board 3110 coupled thereto and subjected to the airflow. In other embodiments, the power supply 3112 and/or circuit board 3110 may be located physically outside the airflow channel 3108, but may have one or more heat sinks coupled thereto, such that they could be said to be thermally coupled to the airflow channel 3108. The one or more light sources 3102 may be coupled to a portion 3116 of the airflow chamber 3114. The chamber 3114 has a first opening 3122 at the lower side of the chamber 3114 and the second opening 3124 is located at the upper side of the chamber 3114. In other embodiments, there may be more than one opening or the openings may be in different locations on the chamber 3114. Further, the second opening 3124 is shown expelling the air on the side of the chamber, but in other embodiments, the second opening 3124 may expel the hot air into the recessed portion 204 of the ceiling 202 where it is then transported upwardly through the building.

In contrast to FIG. 30, where the airflow chamber 3002 was a single piece of material and separate and independent from the LED assembly 3010, the airflow chamber 3114 in FIG. 31 is integrated with the LED assembly 3102. In one example of the present invention, the chamber 3114 is adjustable along a shaft 3118 either before, or after, the assembly 3100 is screwed into the light-bulb outlet 3120. The chamber 3114 is translated upward or downward at will by a user. This can be accomplished, for example, by ball detents, friction, by pressing and depressing a button 3126 the releases a shaft 3128 into a plurality of slots 3130, or any other mechanical mode for allowing two objects to selectively translate relative to one another. This feature allows the user to selectively adjust the chamber 3114 to an appropriate height sufficient for it to be flush against the ceiling 202.

Figure 32:
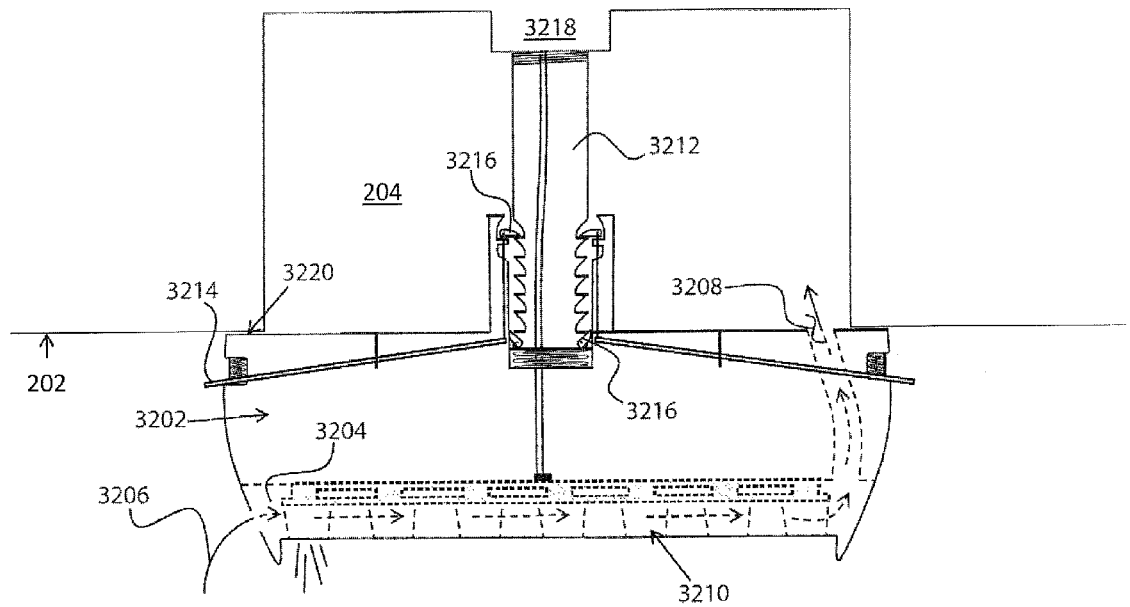
FIG. 32 is a side elevational, cross-sectional, view of a self-cooled lighting assembly in operation that is coupled to a standard-sized light bulb outlet, with the assembly being adjustable in accordance with an embodiment of the present invention.

Referring now to FIG. 32, another example of the present invention is shown. The chamber 3202 defines an airflow channel 3204 that facilitates and directs the transfer of airflow (represented by arrows 3206) to the second opening 3208. The second opening 3208 expels the hot air generated from the components of the LED assembly 3210 into the recessed 204 portion of the ceiling 202 where it is transferred into the ceiling through the electrical outlet 3218 or one or more portions 3220 of the upper surface of the assembly 3200. Similar to FIG. 31, the assembly 3200 is adjustable vertically along the shaft 3212. In one embodiment, when the assembly 3200 is to be adjusted, the user presses the lever 3214. The assembly 3200 is coupled to the shaft 3212 with rotatable hooks 3216 that prevents chamber 3202 from traveling pass the end of the shaft 3212. The shaft 3212 may also have a void located therein for electrical wiring. In other embodiments, the assembly 3200 may be adjustable using notches, threading, or other similar means to allow the assembly 3200 to be adjusted as discussed.

Figure 33:
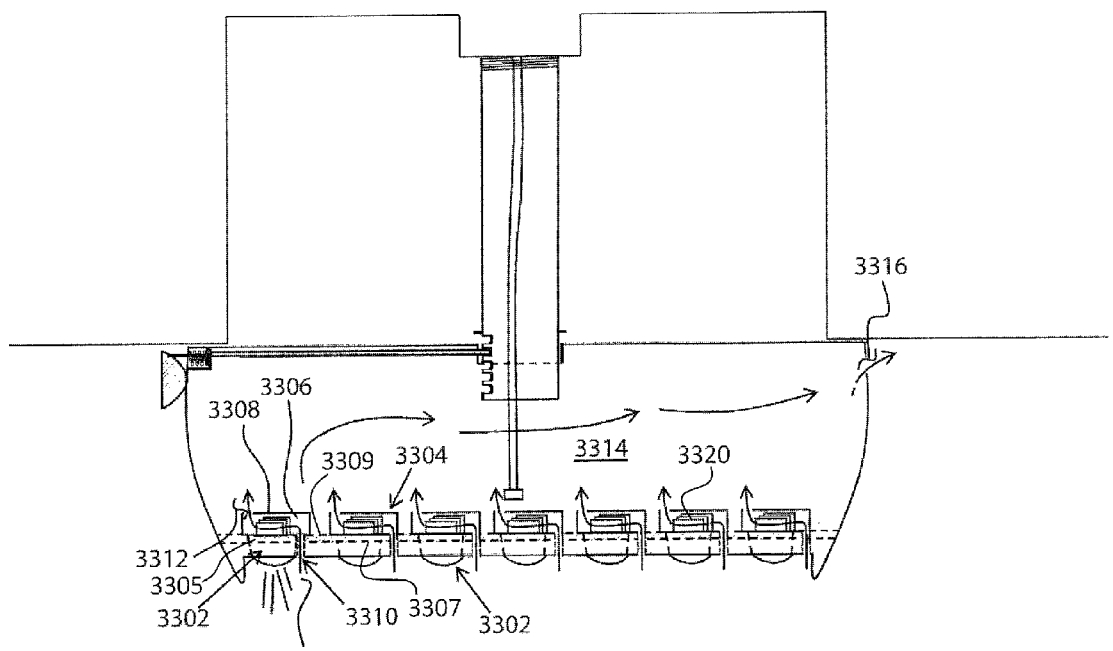
FIG. 33 is a side elevational, cross-sectional, view of a self-cooled lighting assembly in operation with individualized airflow chambers inducing a stream of airflow across multiple light bulb assemblies when the assembly is in operation in accordance with an exemplary embodiment of the present invention.
Figure 34:
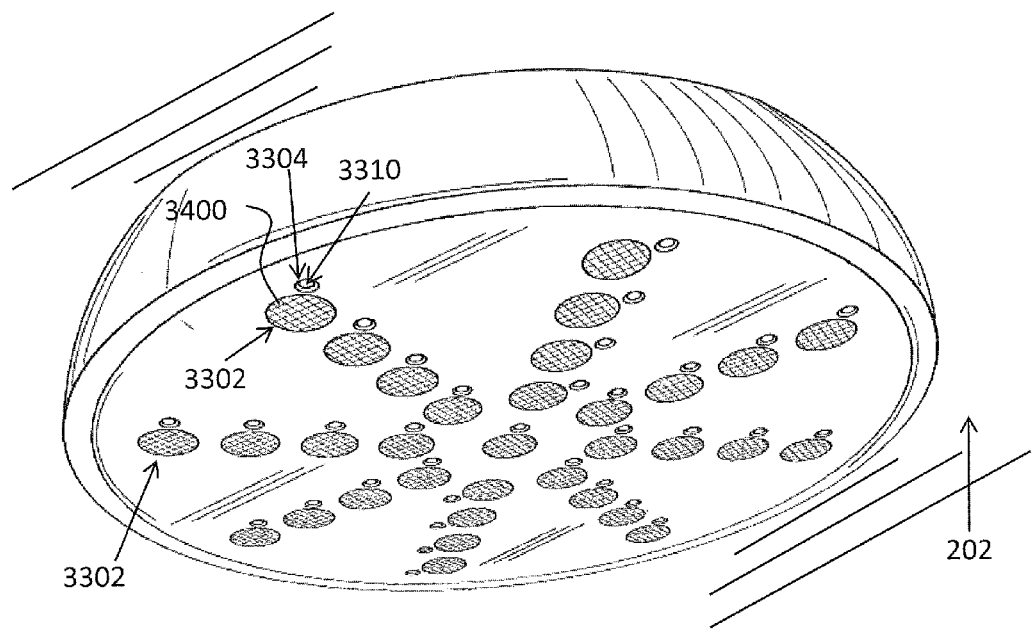
FIG. 34 is an upwardly-looking perspective partial view of the lighting assembly of FIG. 33 when coupled to the ceiling of a building in accordance with an embodiment of the present invention.
Figure 35:
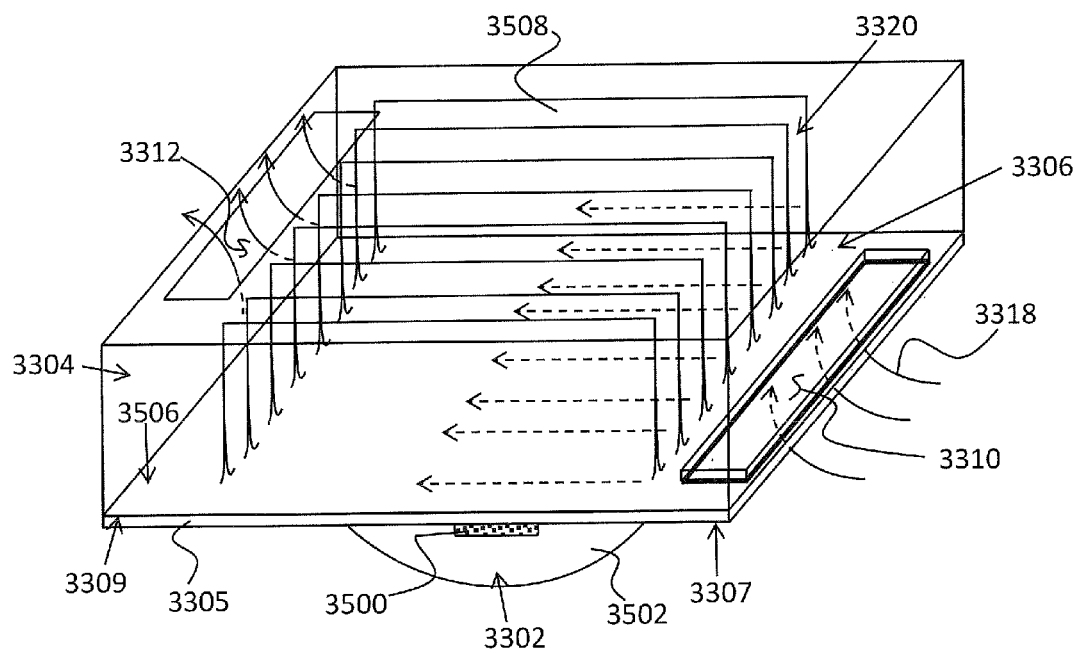
FIG. 35 is a perspective, partially cross-sectional, view of the individualized airflow chamber coupled to a portion of the light bulb assembly shown in FIG. 33.

Referring now to FIGS. 33-35, one embodiment of the present invention is shown. Specifically, the assembly 3300 has multiple light bulb assemblies 3302, or light sources 3302, that each have a separate chamber 3304, or heat-dissipating engine 3304, that defines an airflow channel 3306. The assembly 3300 has a substrate 3305 that supports the light source 3302 and has a front and back surface 3307, 3309. The front and back surfaces 3307, 3309 define the first opening 3310, also called an aperture 3310. The light source 3302 is supported by the substrate 3305 and is adjacent to the aperture 3310. The side wall 3308 of the chamber 3304 may also define the first opening 3310. As shown, the light source 3302 is operable to emit light from the front surface 3307. The heat-dissipating engine 3304 is coupled to the back surface 3309 of the substrate 3305. In one embodiment, the substrate is also a circuit board. In other embodiments, the substrate 3305 is a structure attached to the light source 3302 or another portion of the assembly 3300.

The airflow channel 3306 extends from the aperture 3310, across a portion of the light-source, and out of the second opening 3312, also called an exhaust port 3312, which transmits the hot air to an outside environment. In contrast to prior figures, which have shown a single chamber 3304 or heat-dissipating engine 3304, FIG. 33 illustrates how multiple airflow channels 3306 are defined from each heat-dissipating engine 3304. The airflow from each channel 3306 are then accumulated into a separate chamber 3314 that dissipates the hot air through a distal opening 3316 in the assembly 3300. The flow of air generated from the assembly, when in operation, is shown by the arrows 3318. In one embodiment, the portion of the light-source 3302, which the air flows across, is one or more heat sinks 3320.

FIG. 34 is an upwardly-looking perspective view of the assembly 3300 when coupled to the ceiling. The light transmitting portion of the light-source 3302, or more specifically a casing 3400 which covers the light-source 3302, is shown protruding from the end face of the assembly 3300. Also shown is the first opening 3310 which is placed in fluid communication with an outside environment. In one embodiment, the assembly 3300 may have the light-sources 3302 organized and configured in a star-like shape. In other embodiments, the light-sources 3302 may be configured in a circular fashion, or other orientation, as desired.

FIG. 35 illustrates a close up view of heat-dissipating engine 3304 coupled to the substrate 3305, which is coupled to the light-source 3302. In one embodiment, the light-emitting element 3500, e.g., a LED diode, is located on the front surface 3307 of the substrate 3305, which may be a circuit board. The element 3500 is encapsulated in a casing 3502 to protect the integrity of, and effectively prorogate, the light generated from the element 3500. The back surface 3309 of the substrate 3305 is coupled to the engine 3304 and has an opening that mates with an opening in a bottom surface 3506 of the engine 3304 to at least partially define the aperture 3310. In other embodiments, a power supply or other components may be at least partially within the airflow channel 3306. Further, a mounting bracket may also be utilized to stabilize the light-source 3302 that may include a portion removed to form either the aperture or the exhaust port 3310, 3312.

Coupled to the bottom surface 3506 and extending upwardly therefrom is the heat sink 3320 with one or more members 3508 that are aligned in the general direction of airflow 3318. In other embodiments, the light-source 3302 may not have a heat sink 3320 or the heat sink 3320 may take the form of a plate or other surface. In further embodiment, the heat engine 3304 may not have a bottom surface 3506 and may couple to the back surface 3309 of the substrate 3305. When in operation, a stream of air 3318 enters the first opening 3310 and passes through the members 3508, which are thermally coupled to the element 3500, thereby removing the heat generated from the element 3500. The heat from the element 3500 is then transported through the exhaust port 3312 into the separate collection chamber 3314 where it is expelled into the outside environment.

Figure 36:
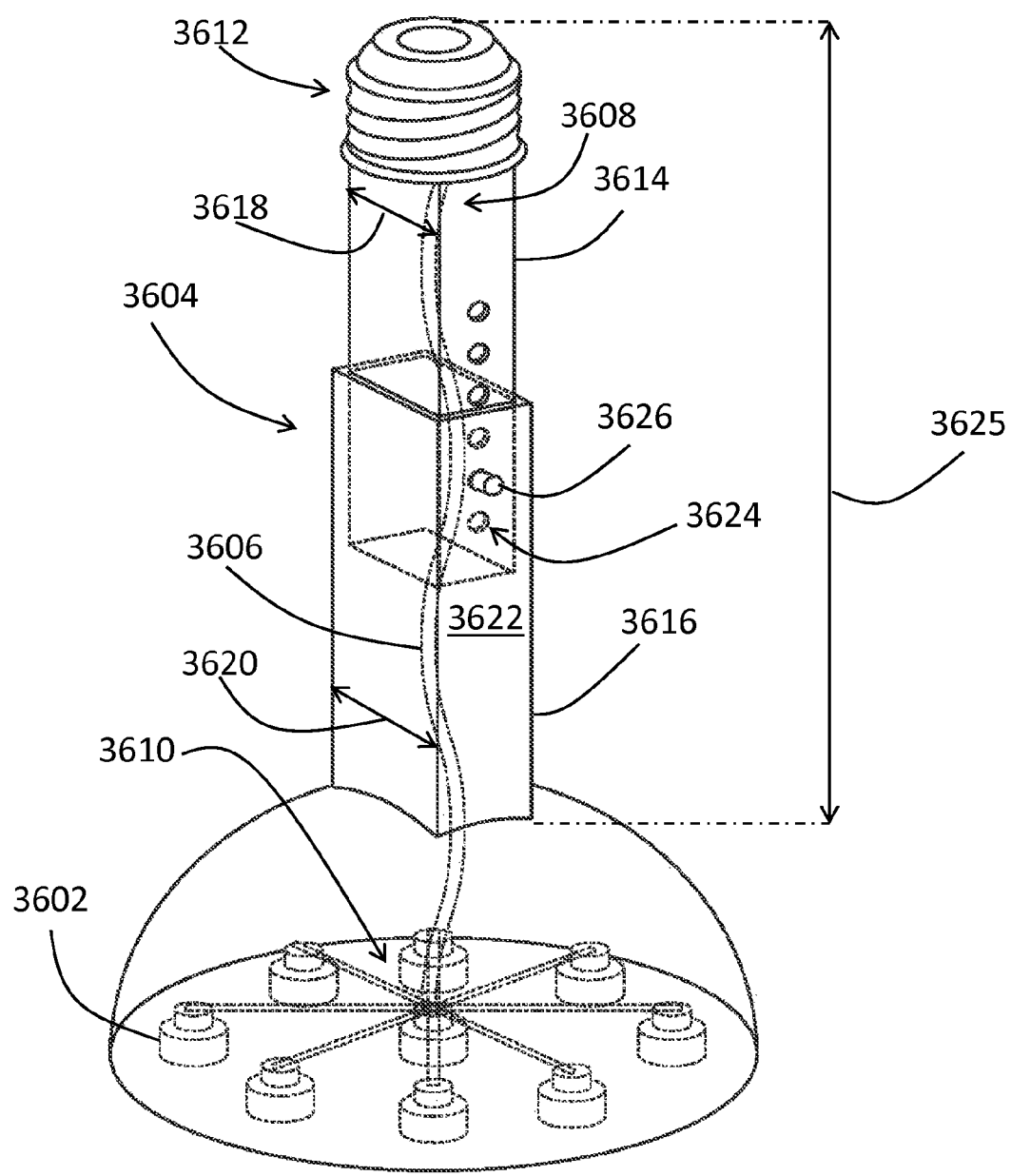
FIG. 36 is a perspective view of a lighting assembly having a telescoping assembly with a square-shaped cross section in accordance with the present invention.

Referring to FIG. 36, another exemplary lighting fixture 3600 is presented in a perspective view. The lighting fixture 3600 includes a light-source 3600 operable to emit light. In one embodiment, the light-source 3602 can include a light-bulb. In another embodiment, the light-source 3602 can include an LED assembly. The light-source can be any device operable to emit light.

In one embodiment, the lighting fixture 3600 further includes a telescoping assembly 3604. As used herein, the term "telescoping" is intended to indicate a device that moves in one direction along a longitudinal axis of the device and an opposite direction along the longitudinal axis so as to vary a longitudinal length of the device. In one embodiment, the telescoping assembly 3604 electrically couples the light-source 3602 to a standard light-bulb outlet for supplying power to the light-source 3602. For example, the telescoping assembly 3604 may house an electrical wire 3606 having a first end 3608 and a second end 3610 opposite the first end 3608, the first end 3608 coupled to a light-bulb outlet connecting end 3612 and the second end 3610 coupled to the light-source 3602. In one embodiment, the light-bulb outlet connecting end 3612 is configured to couple to the standard light-bulb outlet for receiving power from a power source. In another embodiment, the light-bulb outlet connecting end 3612 is threaded so as to allow coupling of the end 3612 to the light-bulb outlet through a screw attachment system. In further embodiments, the light-bulb connecting end 3612 may be formed as other types of male or female attachment members to matingly engage a corresponding male or female attachment member associated with the light-bulb outlet disposed within a light bulb recess. In another embodiment, the telescoping assembly 3604 includes a lower end 3628, opposite the light-bulb outlet connecting end 3612, which can be considered an upper end of the telescoping assembly 3604. In a further embodiment, the lower end 3628 is coupled to a sidewall 3630 of the light assembly 3600, the sidewall 3630 defining a housing for the light-source 3602.

In a preferred embodiment, the telescoping assembly 3604 is a non-circle telescoping assembly 3604. As used herein, the term "non-circle" is intended to indicate any telescoping device in which the telescoping members having a cross section that is not in the shape of a circle, a circle being a plane curve everywhere equidistant from a given fixed point, the center. In one embodiment, the non-circle telescoping assembly 3604 includes a cross section shaped as an oval. In other embodiments, the non-circle telescoping assembly 3604 includes a cross section shaped as a rectangle, square, trapezoid, or other polygon. Advantageously, the non-circle shape of some of the embodiments of the telescoping assembly 3604 prevents rotation of the telescoping assembly 3604 portions, respective to one another, while screwing the lighting fixture 3600 into the light-bulb outlet because rotation of the telescoping portions while screwing could, in some cases, inhibit the user's ability to tightly screw the telescoping assembly 3604 into the light-bulb outlet.

In one embodiment, the telescoping assembly 3604 includes an inner telescoping member 3614 and an outer telescoping member 3616. In one embodiment, the inner telescoping member 3614 includes a rectangular cross section and the outer telescoping member 3616 includes a rectangular cross section. In other embodiments, the inner and outer telescoping members 3614 and 3616 include cross sections shaped as other non-circle shapes. In a preferred embodiment, the inner and outer telescoping members 3614 and 3616 include cross sections have the same shape. Stated another way, if the inner telescoping member 3614 includes an oval cross section, the outer telescoping member 3616 includes an oval cross section, as the inner telescoping member 3614 is configured to be translatably received into an aperture defined by the outer telescoping member 3616. In another embodiment, a diameter 3618 of the inner telescoping member 3614 is less than a diameter 3620 of the outer telescoping member 3616. In yet another embodiment, the outer telescoping member 3616 defines a chamber 3622 that is dimensioned to receive at least a portion of the inner telescoping member 3614 therein for selectively varying a distance 3625 between the light-source 3602 and the light-bulb connecting end 3612 of the telescoping assembly 3604. Advantageously, the telescoping assembly 3604 allows users to selectively vary the distance 3625 of the light-source 3602 relative to the light-bulb outlet.

The telescoping assembly members 3614 and 3616 may be selectively secured to one another in various ways in a multitude of different embodiments. In one embodiment, the inner telescoping member 3614 includes a plurality of apertures 3624. In another embodiment, the plurality of apertures 3624 are spaced apart from one another and aligned along a longitudinal direction of the telescoping assembly 3604. In yet another embodiment, the plurality of apertures 3624 are spaced apart an equal distance from one another. In a further embodiment, the plurality of apertures 3624 are shaped and sized to receive a locking member 3626 therethrough, the locking member 3626 being operably configured to secure the outer telescoping member 3616 relative to the inner telescoping member 3614 in a user-selected position along the longitudinal direction of the telescoping assembly 3604. In one embodiment, the locking member 3626 is formed as a protrusion extending towards a central axis of the chamber 3622 for lockingly engaging a user-selected one of the plurality of apertures 3624. In an alternative embodiment, the plurality of apertures 3624 may be defined by the outer telescoping member 3616, rather than the inner telescoping member 3614. In one embodiment, the locking member 3626 is formed as a bias member configured to exert a resilient force so as to allow users to selectively secure the inner and outer telescoping members 3614 and 3616 relative to one another for selectively varying the distance 3625 between the light-source 3602 and the light-bulb outlet connecting end 3612 of the telescoping assembly 3604. In a further embodiment, the bias member can be considered a spring biased member.

Figure 37:
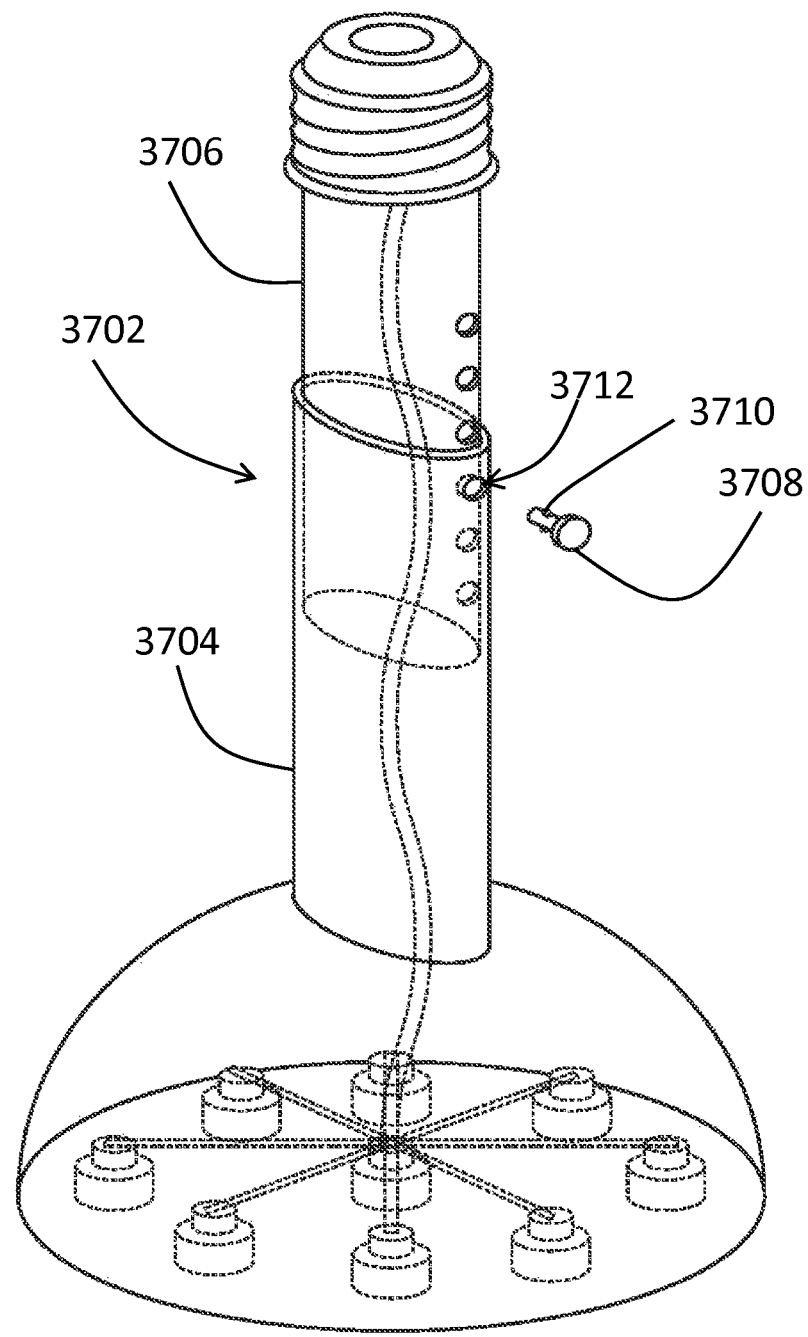
FIG. 37 is a perspective view of another exemplary lighting assembly having a telescoping assembly with an oval-shaped cross section in accordance with the present invention.

Referring to FIG. 37, yet another exemplary lighting fixture 3700 is presented in a perspective view. The lighting fixture 3700 includes an oval-shaped telescoping assembly 3702 having an outer oval-shaped telescoping member 3704 and a mating inner oval-shaped telescoping member 3706. The outer and inner oval-shaped telescoping members 3704 and 3706 are similar to the outer and inner telescoping members 3614 and 3616, except that latter are rectangular-shaped rather than oval-shaped. In one embodiment, the lighting fixture 3700 includes a locking member 3708 having a pair of spring-loaded ball detents 3710 that selectively secures the outer and inner oval-shaped telescoping members 3704 and 3706 to one another for varying the length of the oval-shaped telescoping assembly 3702. In one embodiment, the outer oval-shaped telescoping member 3704 includes an aperture 3712 for receiving the locking member 3708 therethrough.

Figure 38:
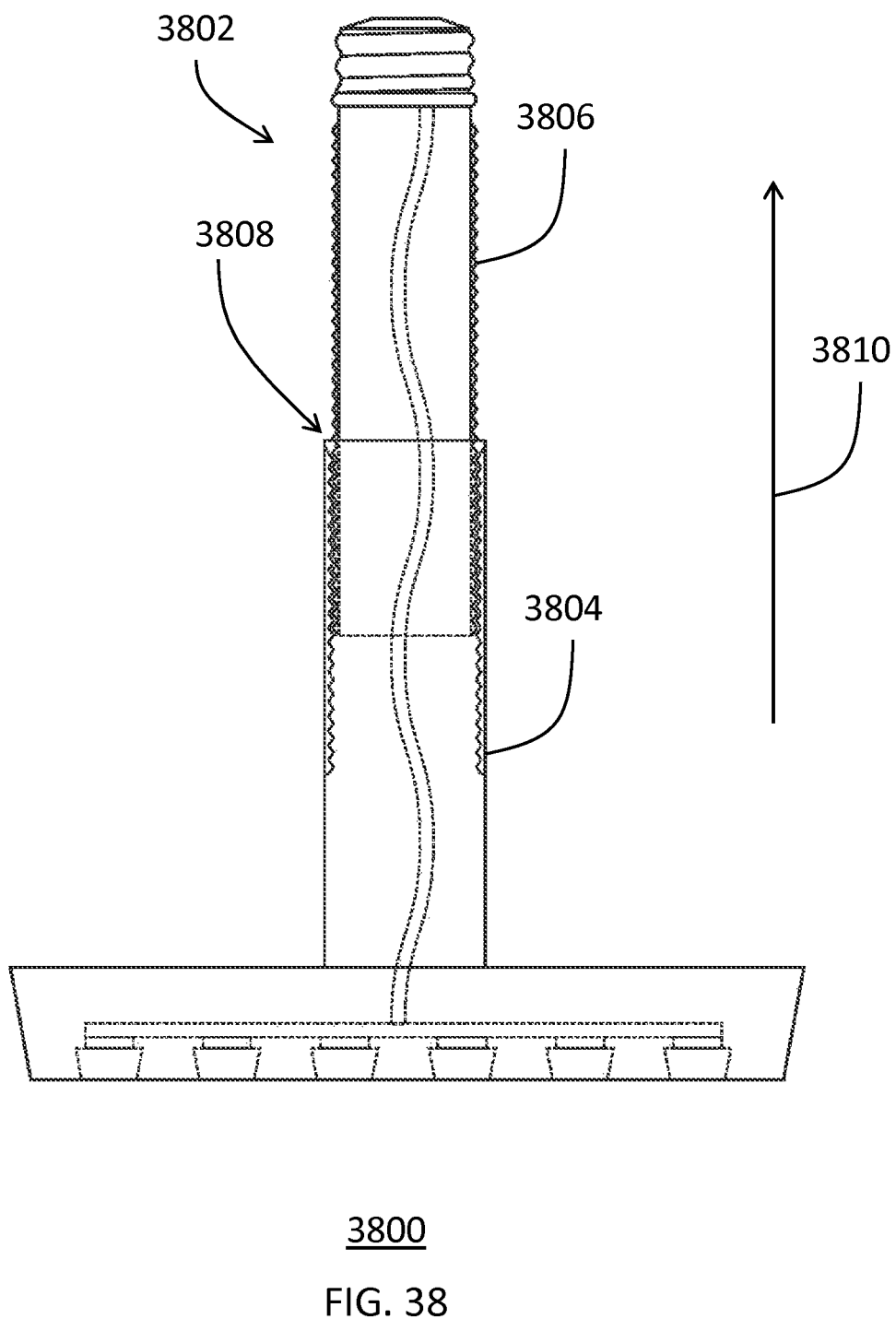
FIG. 38 is a front, elevational view of a further exemplary lighting assembly having a ratchet-type telescoping assembly in accordance with the present invention.

Referring to FIG. 38, a further exemplary lighting fixture 3800 is presented in a front elevational view. The lighting fixture 3800 includes a telescoping assembly 3802 having an outer telescoping member 3804 and an inner telescoping member 3806. In one embodiment, the outer telescoping member 3804 and the inner telescoping member 3806 each include a plurality of mating coupling members 3808. In another embodiment, each of the plurality of mating coupling members 3808 are formed as resilient teeth-like members. In a further embodiment, the resilient teeth-like members are ratchet-type members and are biased so that an upward force 3810 applied to the outer telescoping member 3804 allows the outer telescoping member 3804 to move in an upward direction relative to the stationary, inner telescoping member 3806. As a result of the user releasing the lighting fixture 3800 so that the upward force 3810 is no longer applied to the outer telescoping member 3804, the resilient teeth-like members of the outer telescoping member 3804 and the inner telescoping member 3806 matingly engage one another to as to secure the telescoping assembly 3802 at the selected length. Advantageously, this embodiment allows the user to selectively adjust the length of the telescoping assembly 3802 without requiring the user to reach into the cavity defined by the recessed can in the ceiling in order to, for example, insert a pin into a hole in order to secure the selected length.

Figure 39:
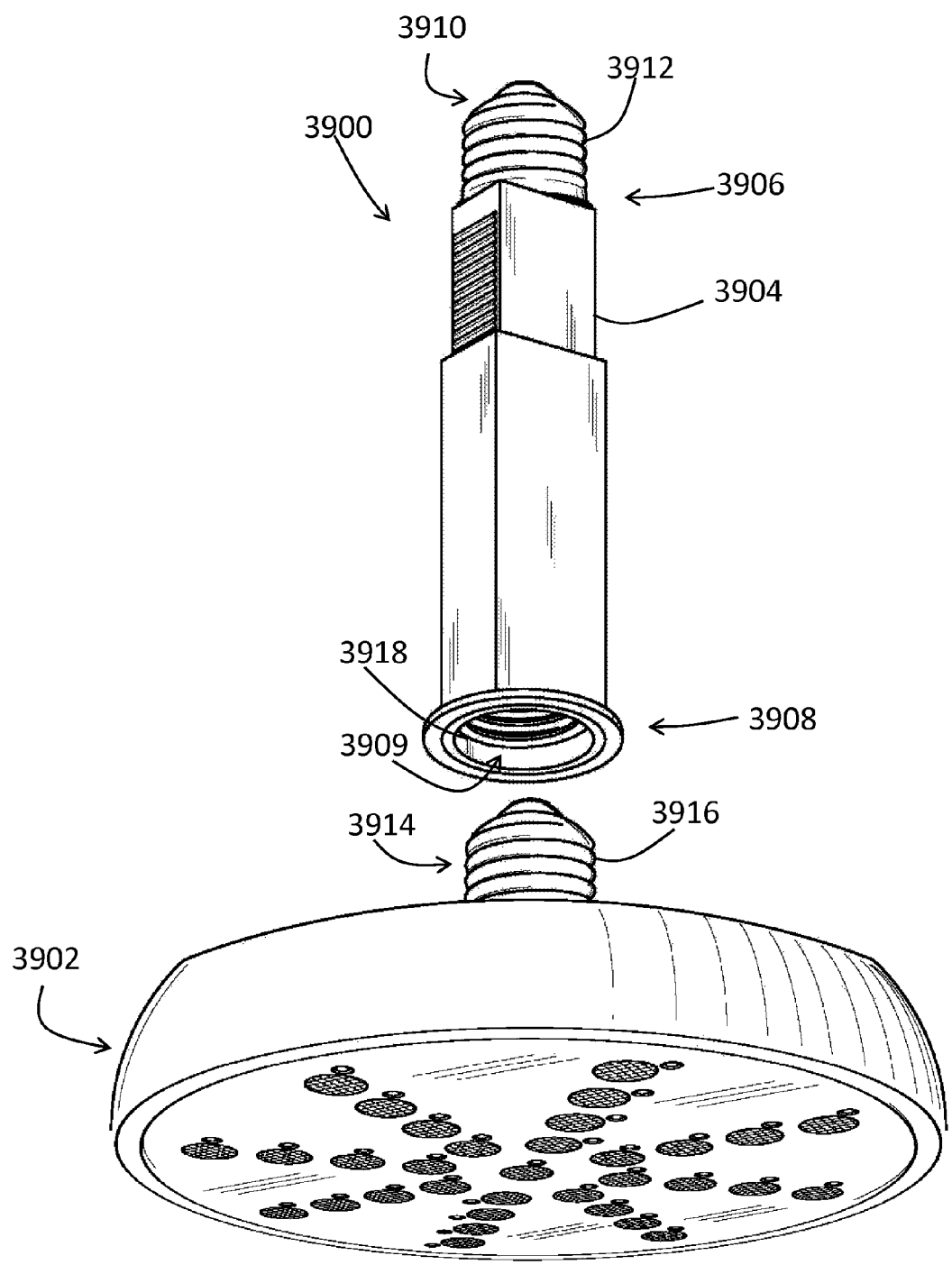
FIG. 39 is a bottom perspective view of another exemplary lighting assembly having a telescoping extension adapter that is selectively couplable to a lighting fixture on one end and a light-bulb socket on the other end in accordance with the present invention.

Referring to FIG. 39, a lighting fixture extension adapter 3900 and a lighting fixture 3902 is presented in a bottom perspective view, in an unassembled configuration. The lighting fixture extension adapter 3900 includes a telescoping assembly 3904 having a first end 3906 and a second end 3908, opposite the first end 3906. In one embodiment, the first end 3906 includes a male attachment member 3910 disposed thereon. In another embodiment, the male attachment member 3910 is operably configured to matingly engage a standard light-bulb socket. In a further embodiment, the male attachment member 3910 includes male threads 3912 that are configured to be inserted into a standard light-bulb socket, the standard light-bulb socket having mating female threads. In one embodiment, the second end 3908 includes a female attachment member 3909 disposed thereon. In another embodiment, the female attachment member 3909 is operably configured to matingly engage a second male attachment member 3914 disposed on the lighting fixture 3902. In yet a further embodiment, the second male attachment member 3914 also includes male threads 3916 that are configured to matingly engage a standard light-bulb socket. In yet another embodiment, the second male attachment member 3914 is substantially identical to the male attachment member 3910. In one embodiment, the female attachment member 3909 includes female threads 3918 that are configured to receive and mating engage the male threads 3916 of the lighting fixture 3902. In one embodiment, the female threads 3918 of the lighting fixture extension adapter 3900 are substantially similar to female threads within a standard sized light-bulb socket. In a further embodiment, the female threads 3918 are substantially contiguous in a spiral configuration. In yet a further embodiment, the male threads 3912, 3916 are substantially contiguous in a spiral configuration. In another embodiment, the female threads 3918 and the male threads 3912, 3916 are coaxial with one another. In another embodiment, the male and female threads 3912, 3916, 3918, respectively are secured to one another through a screwing action. In a further embodiment, the second male attachment member 3914 and the female attachment member 3909 are configured to be electrically coupled to one another when matingly engaged to one another. In yet a further embodiment, the telescoping assembly 3904 is operably configured to electrically couple the lighting fixture 3902 to the standard light-bulb socket along a selectively adjustable distance therebetween. In yet a further embodiment, the standard light-bulb socket is selectively couplable to the first end 3906 of the telescoping assembly and the lighting fixture 3902 is selectively couplable to the second end 3908. In one embodiment, when the lighting fixture extension adapter 3900 and the lighting fixture 3902 are in an assembled, screwed together configuration, the resulting system resembles the lighting fixture 3800 in FIG. 38.

Figure 40:
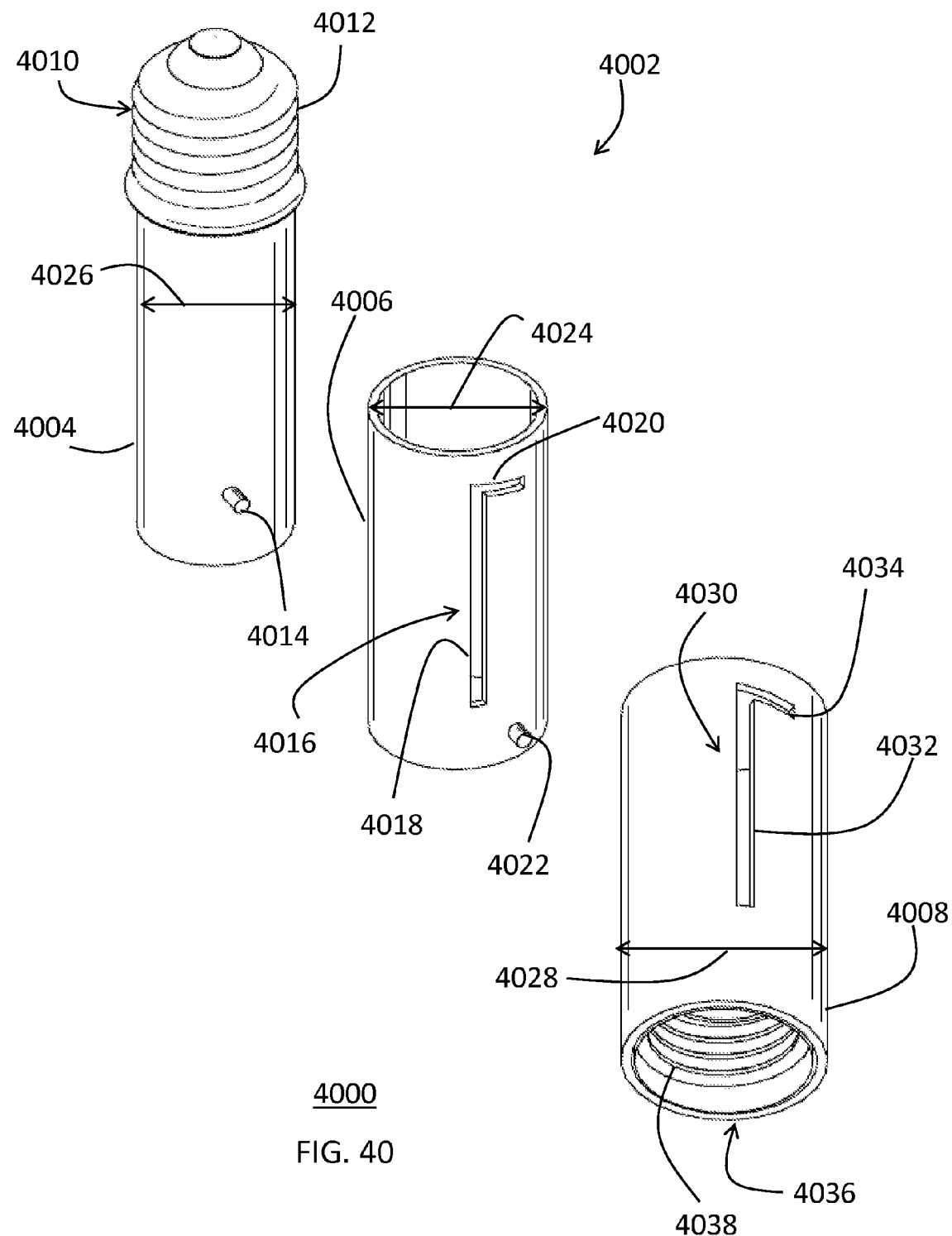
FIG. 40 is an exploded perspective view of a spring-based telescoping extension adapter in an unassembled configuration in accordance with the present invention.
Figure 41:
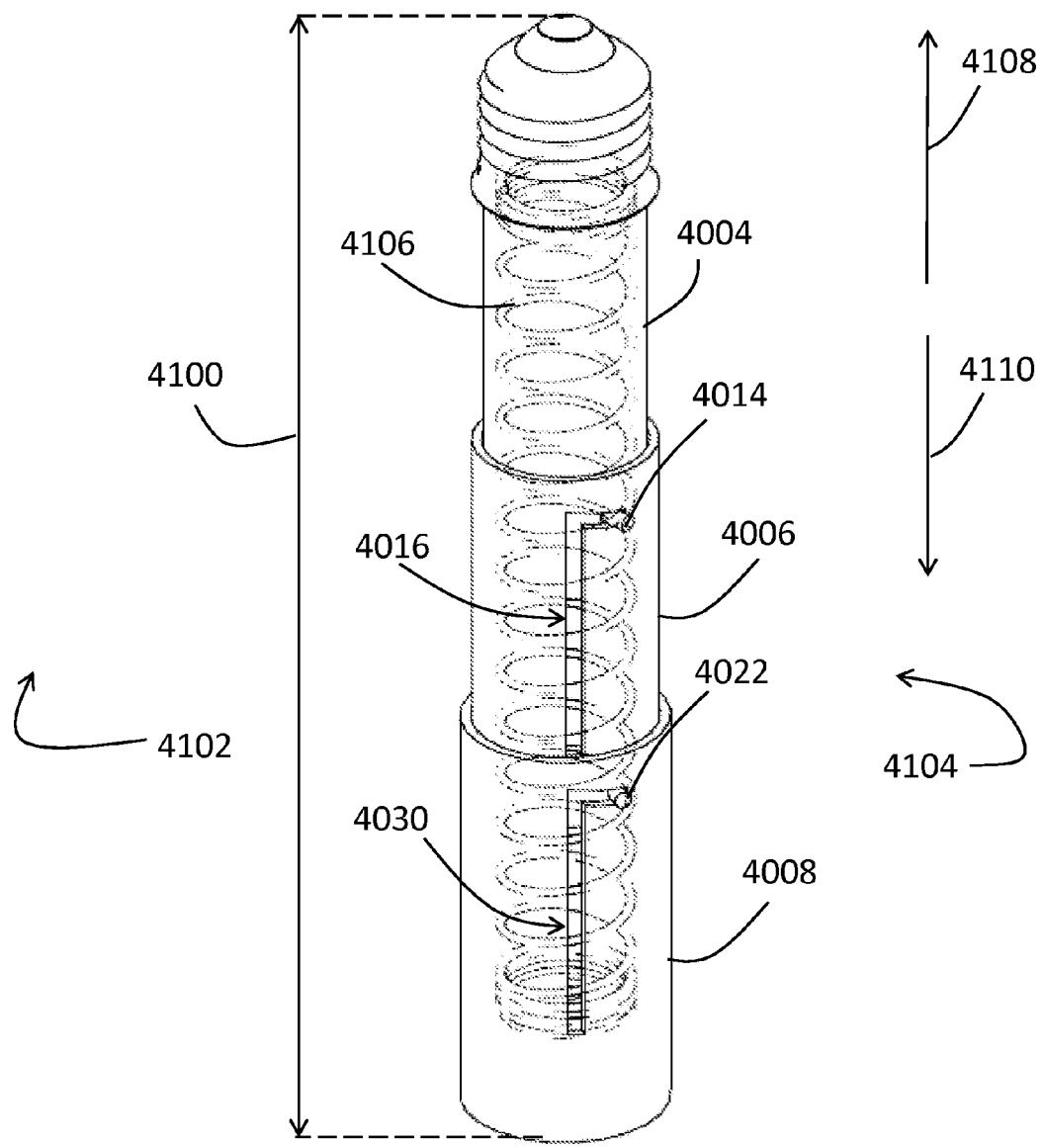
FIG. 41 is a perspective view of the spring-based telescoping extension adapter in an assembled configuration in accordance with the present invention.

Referring to FIGS. 40-41, another exemplary embodiment of a lighting fixture extension adapter 4000 is presented in a perspective view, illustrating an unassembled configuration in FIG. 40 and an assembled configuration in FIG. 41. In one embodiment, the lighting fixture extension adapter 4000 includes a plurality of telescoping members 4002. In another embodiment, the plurality of telescoping members 4002 includes at least a light-bulb socket engaging telescoping member 4004, an intermediate telescoping member 4006, and an outer telescoping member 4008. In yet another embodiment, the plurality of telescoping members 4002 includes one or more additional outer telescoping members (not shown) having a larger diameter than a diameter of the outer telescoping member 4008. It is understood that each addition telescoping member can extend a total length 4100 of the lighting fixture extension adapter 4000 in its fully extended configuration. In another embodiment, each of the plurality of telescoping members 4002 is a circular telescoping member, i.e. having a circular cross-section, as opposed to a non-circle cross-section. Stated another way, each of the plurality of telescoping members 4002 may have a tubular or cylindrical shaped body. In another embodiment, each of the plurality of telescoping members 4002 may be non-circle telescoping members.

In one embodiment, the light-bulb socket engaging telescoping member 4004 includes a male attachment member 4010 disposed on one end of the light-bulb socket engaging telescoping member 4004. In another embodiment, the male attachment member 4010 is operably configured to matingly engage a standard light-bulb socket. In a further embodiment, the male attachment member 4010 includes male threads 4012 that are configured to be inserted (e.g., screwed) into a standard light-bulb socket, the standard light-bulb socket having mating female threads (not shown). In a further embodiment, the light-bulb socket engaging telescoping member 4004 includes a first projecting portion 4014. In one embodiment, the first projecting portion 4014 is shaped as a pin extending outwardly from an exterior surface of an exterior sidewall of the light-bulb socket engaging telescoping member 4004.

In one embodiment, the intermediate telescoping member 4006 defines a first aperture 4016. In another embodiment, the first aperture 4016 is formed as an L-shaped aperture. In another embodiment, the first aperture 4016 is formed in other shapes and configurations. In yet another embodiment, the first aperture 4016 includes a vertical elongated portion 4018 and a horizontal portion 4020, together forming the L-shape of the first aperture 4016. In some embodiments, the first aperture 4016 can be considered a through-hole extending from an exterior surface of the intermediate telescoping member 4006 to an opposing, interior surface of the intermediate telescoping member 4006. In a further embodiment, the intermediate telescoping member 4006 defines a second projecting portion 4022. In another embodiment, the second projecting portion 4022 is shaped as a pin extending outwardly from the exterior surface of the intermediate telescoping member 4006. In one embodiment, a diameter 4024 of the intermediate telescoping member 4006 is smaller than a diameter 4026 of the light-bulb socket engaging telescoping member 4004.

In one embodiment, the outer telescoping member 4008 includes a diameter 4028 larger than the diameter 4024 of the intermediate telescoping member 4006 and larger than the diameter 4026 of the light-bulb socket engaging telescoping member 4004. In another embodiment, the diameter 4028 is slightly larger than the diameter 4024 so as to be slideably engaged to one another and the diameter 4024 is slightly larger than the diameter 4026 so as to be slideably engaged to one another. In another embodiment, the outer telescoping member 4008 defines a second aperture 4030. In another embodiment, the second aperture 4030 is formed as an L-shaped aperture. In another embodiment, the second aperture 4030 is formed as other shapes and configurations. In yet another embodiment, the second aperture 4030 includes a vertical elongated portion 4032 and a horizontal portion 4034, together forming the L-shape of the second aperture 2030. In some embodiments, the second aperture 4030 can be considered a through-hole extending from an exterior surface of the outer telescoping member 4008 to an opposing, interior surface of the outer telescoping member 4008.

In a further embodiment, the outer telescoping member 4008 includes a female attachment member 4036 disposed on an end thereof. In another embodiment, the female attachment member 4036 is operably configured to matingly engage a second male attachment member (not shown) disposed on a lighting fixture (not shown), similar to the configuration shown and described with reference to FIG. 39. In one embodiment, the female attachment member 4036 includes female threads 4038 that are configured to receive and matingly engage male threads of the lighting fixture (not shown). In one embodiment, the female threads 4038 of the lighting fixture extension adapter 4000 are substantially similar to female threads within a standard sized light-bulb socket. In a further embodiment, the female threads 4038 are substantially contiguous in a spiral configuration.

In the assembled configuration, as can be seen in FIG. 41, the light-bulb socket engaging telescoping member 4004 is sized and shaped so as to be selectively, slideably inserted within an opening of the intermediate telescoping member 4006. Accordingly, the intermediate telescoping member 4006 can be considered an outer telescoping member relative to the light-bulb socket engaging telescoping member 4004. In a further embodiment, the intermediate telescoping member 4006 is sized and shaped so as to be selectively, slideably inserted within an opening of the outer telescoping member 4008. Stated another way, the telescoping members 4004, 4006, and 4008 are telescopically translatable relative to one another.

In one embodiment, the telescoping members 4004, 4006, and 4008 are operably configured to prevent rotation relative to one another. In another embodiment, the first projecting portion 4014 is inserted within the first aperture 4016 and the second projecting portion 4022 is inserted within the second aperture 4030. More particularly, insertion of the first projecting portion 4014 within an absolute end of the horizontal portion 4020 of the first aperture 4016 and insertion of the second projecting portion 4022 within an absolute end of the horizontal portion 4034 of the second aperture 4030, as depicted in FIG. 41, prevents rotation of the intermediate telescoping member 4006 and the outer telescoping member 4008 in a first direction 4102 relative to one another. The first direction 4102 may be a clockwise direction. In contrast, rotation of the intermediate telescoping member 4006 and the outer telescoping member 4008 in a second direction 4104 (opposite the first direction 4102) is permitted. The second direction 4104 may be a counter-clockwise direction.

In one embodiment, the lighting fixture extension adapter 4000 includes a spring 4106. As used herein, the term "spring" is defined as an elastic device that regains its original shape after being compressed or extended. In another embodiment, the spring 4106 is disposed within an interior area of the telescoping members 4004, 4006, and 4008. In another embodiment, the spring 4106 is an elastic wire coil extending from the light-bulb socket engaging telescoping member 4004 to the outer telescoping member 4008. In yet another embodiment, the spring 4106 may be formed as other types of elastic devices. In a further embodiment, the spring 4106 is operably configured to translate at least one of the plurality of telescoping members 4002 relative to another one of the plurality of telescoping members 4002 in a compression direction 4108 and an extension direction 4110, opposite the compression direction 4108. In yet a further embodiment, the spring 4106 is operably configured to bias the outer telescoping member 4008 and the intermediate telescoping member 4006 in the compression direction 4108 toward the light-bulb socket engaging telescoping member 4004. Although FIGS. 40 and 41 illustrate a spring-biased lighting fixture extension adapter, it is understood that, in some embodiments, the present invention can be implemented as a lighting assembly with the spring-biased telescoping feature integrated with a lighting fixture as a unitary body, as opposed to the lighting fixture being selectively couplable to the lighting fixture extension adapter 4000, as described with reference to FIGS. 40 and 41.

Figure 42:
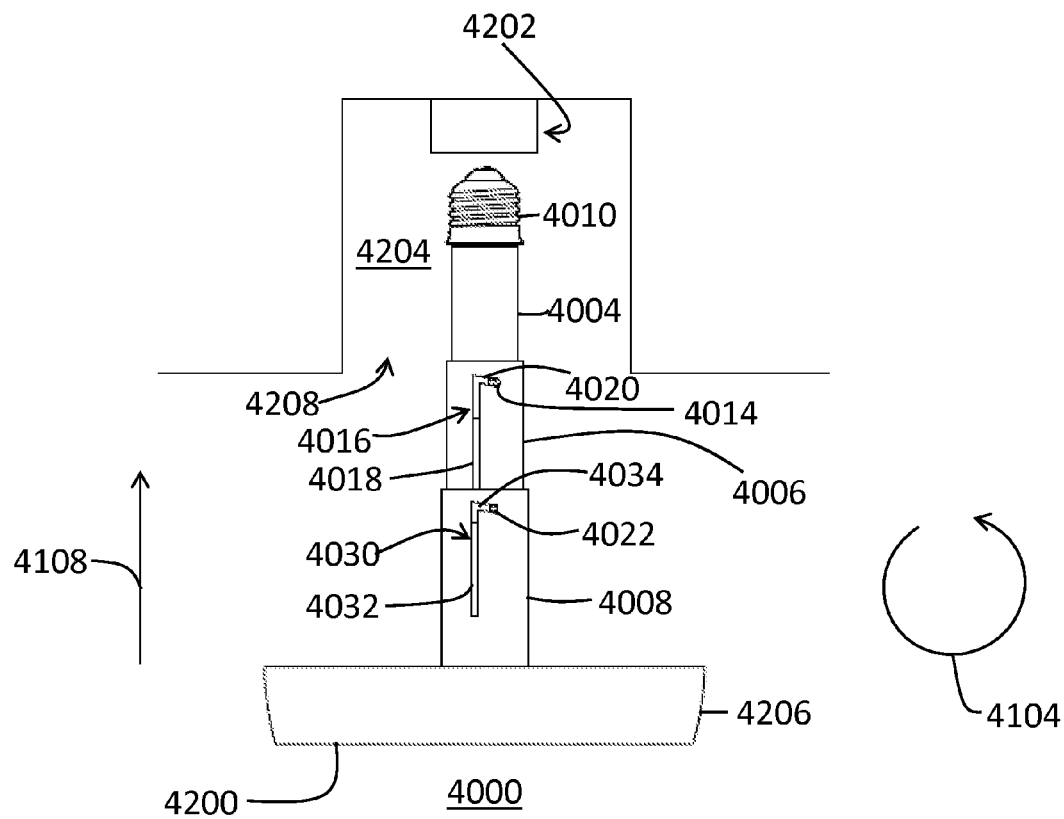
FIG. 42 is a front elevational view of a spring-biased telescoping lighting assembly being installed within a ceiling can in accordance with the present invention.
Figure 43:
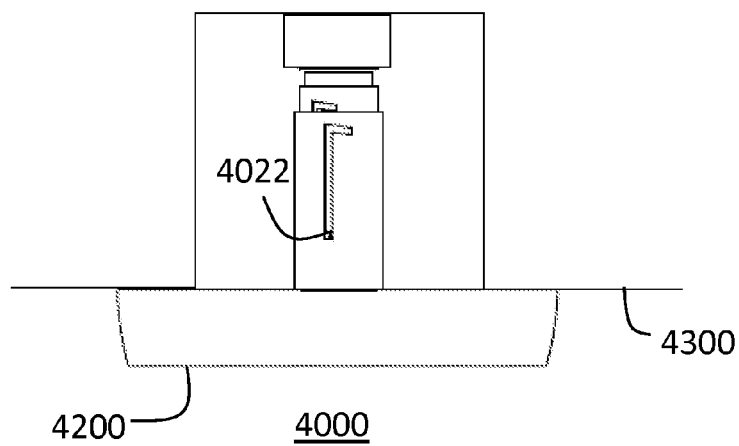
FIG. 43 is a front elevational view of the spring-biased telescoping lighting assembly of FIG. 42 installed within the ceiling can in accordance with the present invention.

Referring now to FIGS. 42-43, in use, a user may begin installing a lighting fixture 4200 into a ceiling can 4204 by screwing the lighting fixture 4200 into the female attachment member 4036 (see FIG. 40) of the lighting fixture extension adapter 4000. In an embodiment where the lighting fixture 4200 is integral with the lighting fixture extension adapter 4000, this step is not necessary. The user may then configure the lighting fixture extension adapter 4000 in a fully, vertically extended configuration. More particularly, the user may configure the lighting fixture extension adapter 4000 such that the first projecting portion 4014 is inserted within the horizontal portion 4020 of the first aperture 4016 and the second projecting portion 4022 is inserted within the horizontal portion 4034 of the second aperture 4030. This configuration holds the lighting fixture extension adapter 4000 in a fully, vertically extended configuration, as can be seen in FIG. 42, overcoming the spring's 4106 (see FIG. 41) bias in the compression direction 4108. In this fully extended configuration, the user may screw in the male attachment member 4010 into a light-bulb socket 4202 in the ceiling can 4204. As the user screws in the male attachment member 4010, the intermediate and outer telescoping members 4006 and 4008 are moved in the second, counter-clockwise direction 4104. As the user continues to screw, the first and second projecting portions 4014 and 4022 are moved to the respective vertical elongated portions 4018 and 4032. As a result, when the user releases the lighting fixture 4200, the biasing force of the spring 4106 (see FIG. 41) in the compression direction 4108 causes the lighting fixture extension adapter 4000 to compress. The projecting portions 4014 and 4022 are allowed to move in a downward direction within the respective vertical elongated portions 4018 and 4032, which permits the intermediate and outer telescoping members 4006 and 4008 to translate telescopically in the upward, compression direction 4108. The lighting fixture 4200 preferably includes a sidewall 4206 that is dimensioned to exceed a maximum opening dimension 4208 of the ceiling can 4204. As can be seen in FIG. 43, the compression force of the spring 4106 (see FIG. 41) causes the lighting fixture extension adapter 4000 to compress until the lighting fixture 4200 is flush with a ceiling 4300.

Although FIGS. 36-43 show the telescoping assembly in pin-and-hole embodiments, and a ratchet-type embodiment, it is understood that the telescoping assembly can be implemented in any manner that allows users to selectively adjust a longitudinal length of the telescoping assembly. In a preferred embodiment, said adjustment of the longitudinal length can be accomplished without the need to reach into the cavity defined by the recessed can in the ceiling, as with the ratchet-type embodiment described with reference to FIG. 38 and the spring-loaded embodiment described with reference to FIGS. 40-43. Other non-limiting examples of adjusting the longitudinal length of the telescoping assembly may include a zip tie, hooks, notches, levers, a frictional snug fit, and the like.

A novel and efficient lighting assembly has been disclosed that provides an array of LED light sources that are coupled to a light-emitting lens through a plurality of light guides, where the light-emitting lens blends the light from each of the individual light guides and transmits a blended light product. Furthermore, the novel lighting assembly provides a light-generation source that is disposed in a central or rear section of the overall lighting assembly and guided to a light-emitting lens through one or more light guides. In addition, the lighting assembly providing a novel telescoping assembly that allows users to selectively vary a distance between the lighting source and the light-bulb outlet.

What is claimed is:

1. A lighting fixture extension adapter comprising:
a telescoping assembly:
having a first end with a male attachment member disposed thereon and a second end, opposite the first end, the second end couplable to a lighting fixture and the male attachment member operably configured to matingly engage a standard light-bulb socket;
including a plurality of telescoping members, the plurality of telescoping members having at least a first telescoping member, a second telescoping member, and a spring disposed within the plurality of telescoping members and biasing in a vertical compression direction the lighting fixture toward the male attachment member;
the first telescoping member defining a first portion and a second portion of an aperture; and
the second telescoping member defining a projecting portion, the projecting portion adapted for a vertical-movement-locking disposition within the first portion of the aperture and a free-vertical-movement disposition within the second portion of the aperture such that a rotational movement of the first telescoping member relative to the second telescoping member moves the projecting portion from the vertical-movement locking disposition, which locks the telescoping assembly in an extended configuration, into the free-vertical-movement disposition, which permits selective adjustment of a vertical length of the telescoping assembly, the free-vertical-movement disposition adapted to automatically move the first telescoping member, by the spring's bias and a clearance provided by the second portion of the aperture, such that the lighting fixture is moved toward the male attachment member along the clearance.

2. The lighting fixture extension adapter in accordance with claim 1, wherein:

the first portion of the aperture is a substantially horizontal portion and the second portion of the aperture is a substantially vertical portion.

3. The lighting fixture extension adapter in accordance with claim 1, wherein:

the plurality of telescoping members includes a third telescoping member.

4. A lighting fixture extension adapter comprising:
a telescoping assembly:
having a first end with a male attachment member disposed thereon and a second end, opposite the first end, the second end coupled to a lighting fixture and the male attachment member operably configured to matingly engage a standard light-bulb socket;
including a plurality of telescoping members, the plurality of telescoping members having at least a first telescoping member, a second telescoping member, and a spring disposed within the plurality of telescoping members and biasing in a vertical compression direction the lighting fixture toward the male attachment member;
the first telescoping member defining a first portion and a second portion of an aperture; and
the second telescoping member having a projecting portion, the projecting portion adapted for a vertical-movement-locking disposition within the first portion of the aperture such that a first rotational movement of the first telescoping member relative to the second telescoping member locks the telescoping assembly in an extended configuration, and a second rotational movement opposite the first rotational movement moves the projecting portion to the second portion of the aperture so as to allow the spring's bias to collapse the plurality of telescoping members such that the lighting fixture moves toward the male attachment member.

5. The lighting fixture extension adapter in accordance with claim 4, wherein:
the lighting fixture includes:
a light-source operable to emit light; and
a sidewall having a dimension exceeding a maximum opening dimension of a light bulb recess, the light bulb recess defined by a ceiling and having a standard light-bulb socket disposed therein and the maximum opening dimension limiting a dimension of objects insertable within the light bulb recess.

6. The lighting fixture extension adapter in accordance with claim 4, wherein:
the telescoping assembly is operably configured to electrically couple the lighting fixture to the standard light-bulb socket along a selectively adjustable distance, the standard light-bulb socket selectively couplable to the first end of the telescoping assembly and the lighting fixture selectively couplable to the second end.

7. The lighting fixture extension adapter in accordance with claim 4, wherein:
the plurality of telescoping members includes a third telescoping member.

8. The lighting fixture extension adapter in accordance with claim 4, wherein:
the male attachment members include male threads that are configured to be inserted into the standard light-bulb socket, the standard light-bulb socket having mating female threads.

9. The lighting fixture extension adapter in accordance with claim 4, wherein:
at least one of the first and second telescoping members preventing rotation of the other one of the first and second telescoping members.

10. The lighting fixture extension adapter in accordance with claim 4, wherein:
the first portion of the aperture is a substantially horizontal portion and the second portion of the aperture is a substantially vertical portion.

11. A lighting assembly comprising:
a lighting fixture including a light-source operable to emit light; and
a telescoping assembly having:
a first end with a male attachment member disposed thereon and a second end, opposite the first end, the second end coupled to the lighting fixture and the male attachment member operably configured to matingly engage a standard light-bulb socket;
a plurality of telescoping members, the plurality of telescoping members having at least a first telescoping member, a second telescoping member, and a spring disposed within the plurality of telescoping members and biasing in a vertical compression direction the lighting fixture toward the male attachment member;
the first telescoping member defining a first portion and a second portion of an aperture; and
the second telescoping member having a projecting portion, the projecting portion adapted for a vertical-movement-locking disposition within the first portion of the aperture such that a first rotational movement of the first telescoping member relative to the second telescoping member locks the telescoping assembly in an extended configuration, and a second rotational movement opposite the first rotational movement moves the projecting portion to the second portion of the aperture so as to allow the spring's bias to collapse the plurality of telescoping members such that the lighting fixture moves toward the male attachment member.

12. The lighting assembly in accordance with claim 11, wherein:
the lighting fixture further includes:
a sidewall having a dimension exceeding a maximum opening dimension of a light bulb recess, the light bulb recess defined by a ceiling and having a standard light-bulb socket disposed therein and the maximum opening dimension limiting a dimension of objects insertable within the light bulb recess.

13. The lighting assembly in accordance with claim 12, wherein:
the lighting fixture further includes:
a light-source-supporting substrate within the sidewall and having a front surface and a back surface and defining an aperture between the front surface and the back surface; and
a heat-dissipating engine coupled to the back surface of the substrate and in fluid communication with the aperture, the heat-dissipating engine defining an airflow channel from the aperture, across a portion of the light-source, and out of an exhaust port in the sidewall higher in altitude than the aperture, the heating dissipating engine driving a substantially continuous flow of air from the aperture, across the portion of the light-source, and out of the exhaust port, without the use of a fan;
the light-source is supported by the substrate, adjacent the aperture, and operable to emit light from the front surface of the substrate; and
the light-source is dimensioned to fit within the light bulb recess and couplable to the standard light-bulb socket.

14. The lighting assembly in accordance with claim 11, wherein:
the telescoping assembly is operably configured to electrically couple the lighting fixture to the standard light-bulb socket along a selectively adjustable distance, the standard light-bulb socket selectively couplable to the first end of the telescoping assembly and the lighting fixture selectively couplable to the second end.

15. The lighting assembly in accordance with claim 11, wherein:
the male attachment members include male threads that are configured to be inserted into the standard light-bulb socket, the standard light-bulb socket having mating female threads.

16. The lighting assembly in accordance with claim 11, wherein:
the plurality of telescoping members includes a third telescoping member.

17. The lighting assembly in accordance with claim 11, wherein:
at least one of the first and second telescoping members preventing rotation of the other one of the first and second telescoping members.

18. The lighting assembly in accordance with claim 11, wherein:
the first portion of the aperture is a substantially horizontal portion and the second portion of the aperture is a substantially vertical portion.

19. The lighting assembly in accordance with claim 11, further comprising:
an airflow chamber shaped to be in contact with a ceiling and having a sidewall:
with an upper end dimension that exceeds the largest dimension of a standard-sized light bulb recess in a ceiling;
defining at least one proximal opening; and
defining at least one distal opening in fluid communication with the proximal opening, wherein heat created by the light assembly drives a substantially continuous flow of air from the proximal opening, across a portion of the light assembly, and out of the distal opening without the use of a fan; and
wherein the light assembly is dimensioned and shaped not to completely fit within the standard-sized light bulb recess in the ceiling, the standard-sized light bulb recess being of a size and shape to receive substantially all of a standard-sized light bulb therein.

* * * * *